(12) United States Patent
Ishioka et al.

(10) Patent No.: US 6,266,325 B1
(45) Date of Patent: Jul. 24, 2001

(54) METHOD OF CONTROLLING PATH AUDIT IN SWITCHES

(75) Inventors: Eiji Ishioka; Sumie Morita; Shigeru Sekine; Hiromi Odaka; Yoshihiro Watanabe, all of Kawasaki; Toshiaki Oishi, Yokohama, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/022,956

(22) Filed: Feb. 12, 1998

(30) Foreign Application Priority Data

Jul. 18, 1997 (JP) .................................................. 9-193503

(51) Int. Cl.[7] ........................... G01R 31/08; H04L 12/56; H04J 3/04
(52) U.S. Cl. ........................... 370/248; 370/399; 370/535
(58) Field of Search ...................................... 370/248, 395, 370/398, 399, 300, 250, 401, 409, 230, 252, 535, 467, 242, 218, 219, 220, 227, 422

(56) References Cited

U.S. PATENT DOCUMENTS

| | | | |
|---|---|---|---|
| 5,079,762 | * | 1/1992 | Tanabe ..................................... 370/60 |
| 5,408,461 | * | 4/1995 | Uriu et al. ............................... 370/14 |
| 5,430,715 | * | 7/1995 | Corbalis et al. ........................ 370/54 |
| 5,523,999 | * | 6/1996 | Takano et al. ....................... 370/58.2 |
| 5,748,632 | * | 5/1998 | Honda et al. .......................... 370/399 |
| 5,790,770 | * | 8/1998 | McClure et al. ................. 395/200.61 |
| 5,926,456 | * | 7/1999 | Takano et al. ........................ 370/218 |

* cited by examiner

*Primary Examiner*—Alpus H. Hsu
*Assistant Examiner*—Duc Ho
(74) *Attorney, Agent, or Firm*—Helfgott & Karas, P.C.

(57) ABSTRACT

In a path audit control method, (1) a unit (a discrete unit or common unit) within a switch holds bitmap information indicating whether each channel identifier is being used to establish a path; (2) a central controller sends the unit bitmap information indicating whether each channel identifier has been used to establish a path; (3) the unit compares bitmap information which it itself is holding with bitmap information that has been sent from the central controller; and (4) if the bitmap information held by the unit and the bitmap information that has been sent from the central controller do not match, the central controller and the unit cooperate to execute matching processing in such a manner that the compared items of bitmap information will be made to match.

9 Claims, 29 Drawing Sheets

FIG.4A

| ICID−A | VCC TABLE SETTING? | CTP SETTING? | UPC SETTING? |
|---|---|---|---|
|  |  |  |  |
|  |  |  |  |
|  |  |  |  |
| --- | --- | --- | --- |
|  |  |  |  |

FIG.4B

| ICID−A | VCC TABLE SETTING? |
|---|---|
|  |  |
|  |  |
| --- | --- |

FIG.4C

| ICID−A | CTP SETTING? | UPC SETTING? |
|---|---|---|
|  |  |  |
|  |  |  |
| --- | --- | --- |

FIG.10

| STATE OF CC PATH | STATE OF COMMON UNIT | RESPONSE |
|---|---|---|
| ○ | ○ | NORMAL RESPONSE |
| ○ | × | ABNORMAL RESPONSE RESETTING BY CC |
| × | ○ | SELF-RELEASE AND NORMAL RESPONSE BY COMMON UNIT |
| × | × | NORMAL RESPONSE |

○ : WITH PATH
× : NO PATH

FIG.12

| STATE OF CC | | STATE OF COMMON UNIT | | RESPONSE |
|---|---|---|---|---|
| PATH (UPC) | CTP SETTING | UPC SETTING | CTP SETTING | |
| ○ | ○ | ○ | ○ | NORMAL RESPONSE |
| | | × | ○ | RESETTING BY CC BECAUSE OF ABNORMAL RESPONSE |
| | | × | × | |
| × | ○ | ○ | ○ | RELEASE AND RESET SEGMENT ONLY BY CC BECAUSE OF ABNORMAL RESPONSE |
| | | × | ○ | NORMAL RESPONSE |
| | | × | × | RESET SEGMENT ONLY BY CC BECAUSE OF ABNORMAL RESPONSE |
| × | × | ○ | ○ | SELF-RELEASE AND NORMAL RESPONSE BY DISCRETE UNIT |
| | | × | ○ | |
| | | × | × | NORMAL RESPONSE |

(○:WITH SETTING / ×:NO SETTING)

FIG.13

| STATE OF CC | | STATE OF COMMON UNIT | STATE OF DISCRETE UNIT | | SEQUENCE |
|---|---|---|---|---|---|
| UPC (PATH) | CTP | UPC (PATH) | UPC | CTP | |
| ○ | ○ | ○ | ○ | ○ | FIRST SEQUENCE 1 |
| | | | × | ○ | SECOND SEQUENCE 2 & THIRD SEQUENCE 3 |
| | | | × | × | |
| | | × | ○ | ○ | FOURTH SEQUENCE 4 |
| | | | × | ○ | |
| | | | × | × | |
| × | ○ | ○ | ○ | ○ | FIFTH SEQUENCE |
| | | | × | ○ | |
| | | | × | × | |
| | | × | ○ | ○ | SIXTH SEQUENCE |
| | | | × | ○ | SEVENTH SEQUENCE |
| | | | × | × | EIGHTH SEQUENCE |
| × | × | ○ | ○ | ○ | FIFTH SEQUENCE |
| | | | × | ○ | |
| | | | × | × | |
| | | × | ○ | ○ | NINTH SEQUENCE |
| | | | × | ○ | |
| | | | × | × | FIRST SEQUENCE |

FIG.24

(1) WHEN DISCRETE UNIT DOES NOT MATCH

| STATE OF CC | STATE OF COMMON UNIT | STATES OF DISCRETE UNITS | | |
|---|---|---|---|---|
| | | WORKING SYSTEM | STANDBY SYSTEM | |
| ○ | ○ | ○ | ○ | NORMAL RESPONSE |
| | | ○ | × | ABNORMAL RESPONSE (SET AGAIN FROM CC TO BOTH SYSTEMS) |
| | | × | ○ | |
| | | × | × | |

(2) WHEN COMMON UNIT DOES NOT MATCH

| STATE OF CC | STATE OF COMMON UNIT | STATES OF DISCRETE UNITS | | |
|---|---|---|---|---|
| | | WORKING SYSTEM | STANDBY SYSTEM | |
| ○ | × | ○ | ○ | ABNORMAL RESPONSE (SET AGAIN FROM CC TO BOTH SYSTEMS REGARDLESS OF STATES OF DISCRETE UNITS) |
| | | ○ | × | |
| | | × | ○ | |
| | | × | × | |

(3) WHEN THERE IS NO PATH TO CC

| STATE OF CC | STATE OF COMMON UNIT | STATES OF DISCRETE UNITS | | |
|---|---|---|---|---|
| | | WORKING SYSTEM | STANDBY SYSTEM | |
| × | ○ | ○ | ○ | NORMAL RESPONSE (SELF-RELEASE BOTH SYSTEMS REGARDLESS OF STATES OF DISCRETE UNITS) |
| | | ○ | × | |
| | | × | ○ | |
| | | × | × | |

FIG.27

| STATE OF CC | | STATE OF COMMON UNIT | | |
|---|---|---|---|---|
| ICIDB | ICIDC | ICIDB | ICIDC | |
| ○ | ○ | ○ | ○ | (1) NORMAL RESPONSE |
| | | | × | (2) CC PERFORMS RESETTING BECAUSE OF ABNORMAL RESPONSE WHEN ICID-C BITMAP IS CHECKED |
| | | × | — | (3) CC PERFORMS RESETTING BECAUSE OF ABNORMAL RESPONSE WHEN ICID-B BITMAP IS CHECKED |
| × | ○ | | — | THIS PATTERN NOT POSSIBLE |
| × | × | ○ | ○ | (4) SELF-RELEASE (INCLUSIVE OF ICID-C) AND NORMAL RESPONSE WHEN ICID-B BITMAP IS CHECKED. AUDIT OF ICID-C WITH RESPECT TO ICID-B UNNECESSARY. |
| | | | × | |
| | | × | — | (5) NORMAL RESPONSE |
| ○ | × | ○ | ○ | (6) SELF-RELEASE AND NORMAL RESPONSE WHEN ICID-C BITMAP IS CHECKED |
| | | | × | (7) NORMAL RESPONSE |
| | | × | — | (8) CC PERFORMS RESETTING BECAUSE OF ABNORMAL RESPONSE WHEN ICID-B BITMAP IS CHECKED |

(○:WITH PATH / ×:NO PATH / —:D. C. )

METHOD OF CONTROLLING PATH AUDIT IN SWITCHES

BACKGROUND OF THE INVENTION

This invention relates to a method of controlling path audit in a switch. More particularly, the invention relates to a path audit control method of detecting and, and adjusting for, an abnormality in the setting of a path in an ATM switch.

ATM (Asynchronous Transfer Mode) technology has been agreed upon by the ITU-T for the next generation of switching systems and various facilities are carrying out comprehensive research in an effort to realize broadband ISDNs (Integrated Service Digital Networks).

An ATM switch includes (1) a line interface unit for interfacing lines and for executing UPC control, billing control, NDC (Network Data Collection) control and OAM control, etc.; (2) a switch (an ATM switch) for switching cell paths, (3) a multiplexer/demultiplexer for multiplexing cells that have arrived from a plurality of lines, inputting the cells to a switch, demultiplexing cells that have arrived from the switch and outputting the cells to a prescribed line interface unit, and (4) a central controller for controlling the overall switch. The above-mentioned UPC (Usage Parameter Control) includes performing monitoring to determine whether actual cell inflow rate has exceeded a reported cell inflow rate (transmission rate), passing all arriving cells if the reported value has not been exceeded and, if the reported value has been exceeded, discarding cells that are in violation in such a manner that the cell inflow rate will not exceed the reported value.

In such an ATM switch, the central controller (CC) establishes whether control originally to be executed by the line interface unit is possible or impossible [this is referred to as a "CTP (Connection Terminating Point) setting"] and establishes whether UPC control is possible or impossible (this is referred to as a "UPC setting"). More specifically, the central controller performs a CTP setting and a UPC setting for the line interface unit in regard to paths conforming to channel identifiers (VPI/VCI or internal channel identifiers). If both the CTP and UPC settings are performed with regard to a prescribed channel identifier, full control of the line interface unit becomes possible with regard to cells having this channel identifier. In other words, transmission of cells by UPC control, collection of billing data and traffic data and OAM control, etc., become possible. In a case where the CTP setting and not the UPC setting is performed in regard to a prescribed channel identifier transmission of cells having this channel identifier is not possible but operations other than those related to UPC are possible. In a case where neither the CTP setting nor the UPC setting has been performed with regard to a prescribed channel identifier, none of these control operations can be carried out.

Further, the central controller CC sets routing information (tag information) in a multiplexer/demultiplexer in correspondence with channel identifiers. The multiplexer/demultiplexer places the routing information in a table and, whenever a cell arrives, obtains the routing information, which conforms to the particular channel identifier, from the table, attaches the routing information to the cell and then sends the cell to the ATM switch. The ATM switch routes the cell to a prescribed path based upon this routing information.

In the prior art, path matching processing is not executed (1) between the central controller (CC) and multiplexer/demultiplexer (common unit) and (2) between the central controller (CC) and the line interface unit (discrete unit). Consequently, if paths are left unestablished or if paths are left floating for some reason while the central controller CC is executing path setting/release processing in regard to a common unit or discrete unit, the path setting information being managed by the central controller CC and the path setting information being managed by the common/discrete units will not agree. It should be noted that "floating" of a path refers to a situation in which a path that should have been deleted by the central controller CC is left on the side of a common or discrete unit.

Since path matching processing is not executed in the prior art, however, the above-mentioned mismatch cannot be detected and dealt with in a prompt manner. As a result, communication may become impossible. Since a path that should have been eliminated by the central controller CC will be left on the side of a common or discrete unit, a problem such as excessive billing may arise.

SUMMARY OF THE INVENTION

Accordingly, an object of the present invention is to make possible the prompt and easy detection of unset paths and floating paths.

Another object of the present invention is to execute matching processing in such a manner that path setting information being managed by a central controller and path setting information being managed by common/discrete units will match.

A further object of the present invention is to detect promptly disagree between path setting information being managed by a central controller and path setting information being managed by common/discrete units, execute matching processing in such a manner that these two items of information will match and prevent communication failure and abnormal operation such as excessive billing.

According to the present invention, the foregoing objects are attained by providing a method of controlling path audit of a switch in which a central controller establishes, in correspondence with channel identifiers, cell routing paths in a unit within the switch, and cells are routed to prescribed lines in accordance with the routing paths, comprising the steps of (1) causing information, which indicates whether each channel identifier is being used to establish a path, to be held in bitmap form in a unit (e.g., a multiplexer/demultiplexer) within the switch, (2) sending information, which indicates whether each channel identifier has been used to establish a path, from the central controller to the unit in bitmap form, and (3) causing the unit to compare the bitmap information which it itself is holding with the bitmap information that has been sent from the central controller, thereby to determine whether a path has been normally established in said unit as specified by the central controller. In a case where the bitmap information held and the bitmap information that has been sent do not agree, matching processing is executed by cooperation between the central controller and the unit in such a manner that the compared bitmap information will be made to agree.

Further, according to the present invention, the foregoing objects are attained by providing a method of controlling path audit of a switch in which a central controller establishes, in correspondence with channel identifiers, cell routing paths for a unit within the switch, and cells that have entered from lines are routed to prescribed lines in accordance with the routing paths, comprising the steps of (1) causing information to be held in bitmap form, and for each channel identifier, in a line interface unit, the information indicating, in regard to a path specified by the channel indicator, whether control to be executed originally is possible (CTP setting) and whether UPC control is possible (UPC setting), (2) performing a CTP setting and a UPC setting for each channel identifier and sending bitmap information indicating a CTP setting state and bitmap information indicating a UPC setting state of each channel identifier, and (3) causing the line interface unit to compare bitmap information which it itself is holding with bitmap information that has been sent, thereby to determine whether a CTP setting and a UPC setting have be made as specified by the central controller. In a case where the bitmap information held and the bitmap information that has been sent do not agree, matching processing is executed in such a manner that the compared bitmap information will be made to agree.

Other features and advantages of the present invention will be apparent from the following description taken in conjunction with the accompanying drawings.

BRIEF DESCRIPTION OF THE DRAWINGS

FIGS. 4A–4C show examples of storage of path establishment information;

FIG. 10 is a diagram useful in describing path audit processing of a common unit;

FIG. 12 is a diagram useful in describing path audit processing of a discrete unit;

FIG. 13 is a correspondence table showing the correspondence between UPC/CTP setting states and sequences for each unit;

FIG. 24 is a diagram useful in describing path audit processing which is performed in conformity with the states of a central controller, common unit and each discrete unit;

FIG. 27 is a diagram useful in describing path audit conforming to agreement and non-agreement;

DESCRIPTION OF THE PREFERRED EMBODIMENT (a) Configuration of ATM Switch System FIG. 1 is a block diagram showing the configuration of an ATM system to which path audit control according to the invention is capable of being applied. Shown in FIG. 1 are subscriber line interfaces (or line IFs) $11_{11} \sim 11_{1n}$, $11_{21} \sim 11_{2n}$, $11_{31} \sim 11_{3n}$, $11_{41} \sim 11_{4n}$ connected to corresponding lines (transmission lines), multiplexer/demultiplexers $12_1 \sim 12_4$, an ATM switch unit 13 and a system controller 14 for controlling the line IFs $11_{11} \sim 11_{4n}$, multiplexer/demultiplexers $12_1 \sim 12_4$ and ATM switch unit 13. The system controller 14 has a central controller (CC) 14a and a memory (MM) 14b. Numerals 15 and 16 denote a maintenance terminal and a bus, respectively.

Figure 1:
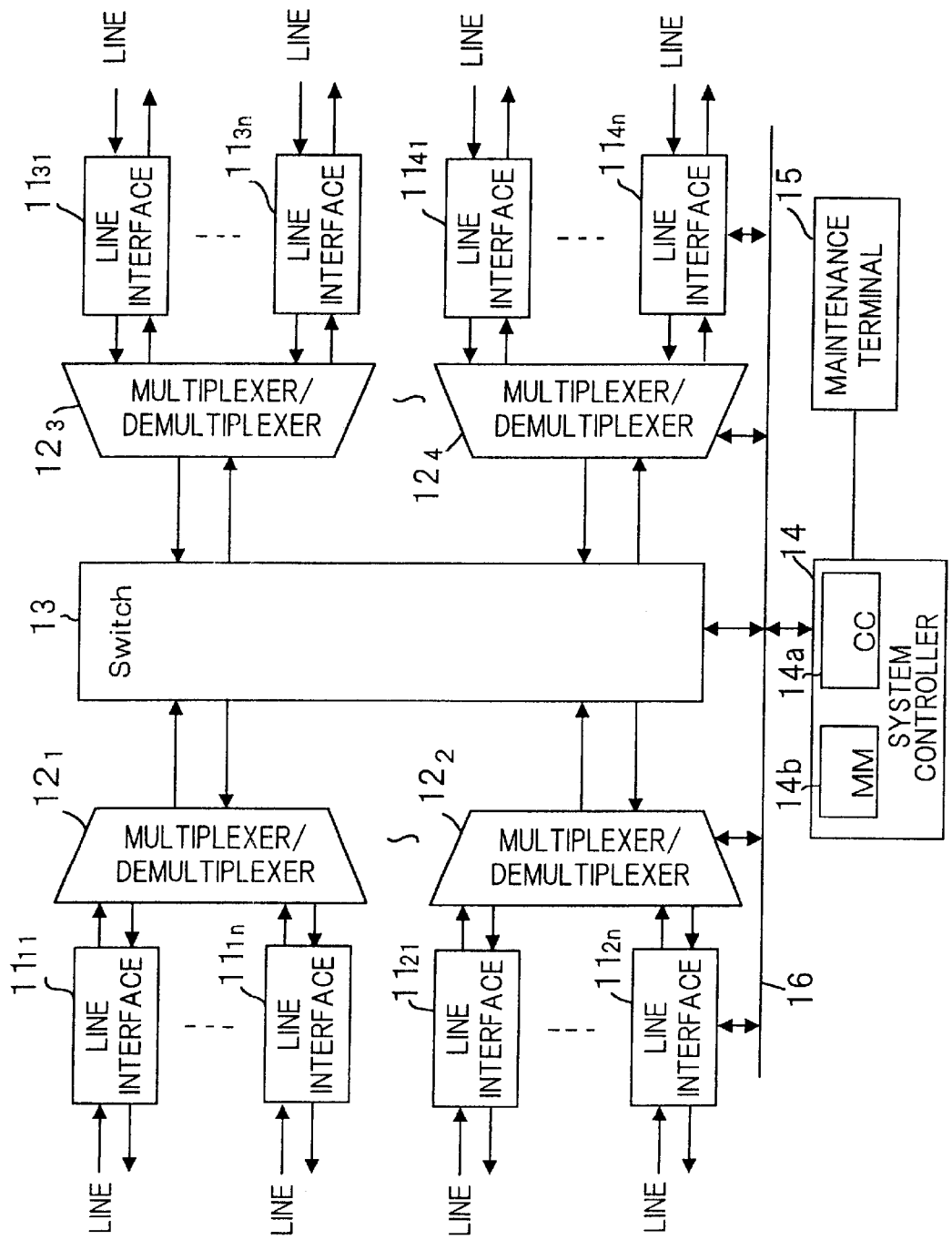
FIG. 1 is a block diagram showing the configuration of an ATM system.

The ATM switch unit 13 is connected to the plurality of multiplexer/demultiplexers $12_1 \sim 12_4$, switches input cells from certain multiplexer/demultiplexers on the basis of routing information (TAG information) that has been appended to the cells, and outputs the cells to prescribed multiplexer/demultiplexers. The multiplexer/demultiplexers $12_1 \sim 12_4$, which are connected to the pluralities of line interfaces $11_{11} \sim 11_{1n}$, $11_{21} \sim 11_{2n}$, $11_{31} \sim 11_{3n}$, $11_{41} \sim 11_{4n}$, respectively, concentrate and multiplex incoming cells from a plurality of line interfaces and output the cells to the ATM switch unit 13. Furthermore, the multiplexer/demultiplexers $12_1 \sim 12_4$ demultiplex and output outgoing cells, which arrive from the ATM switch unit 13, to the pertinent line interfaces.

The central controller 14a of the system controller 14 is capable of sending data to and receiving data from the line interfaces $11_{11} \sim 11_{1n}$, $11_{21} \sim 11_{2n}$, $11_{31} \sim 11_{3n}$, $11_{41} \sim 11_{4n}$, multiplexer/demultiplexers $12_1 \sim 12_4$ and ATM switch unit 13 via the bus 16. More specifically, the central controller 14a sends and receives the following to and from each line interface: (1) information for CTP setting/release, (2) information for UPC setting/release, (3) results of processing by various control operations (billing data, traffic data, fault notification data, PM data, etc.), and (4) path audit information. The central controller 14a sends and receives (1) path setting/release information and (2) path audit information, etc., to and from each multiplexer/demultiplexer.

(b) Line Interfaces (Discrete Units)

The line interfaces $11_{11} \sim 11_{4n}$, which are connected to the corresponding multiplexer/demultiplexers $12_1 \sim 12_4$, each extracts an ATM cell from the payload of a frame signal (e.g. a SONET frame) of a prescribed format that has entered from the line and then converts the ATM cell to a cell having the cell format of the interior of the switch. The line interfaces then output the cells to the multiplexer sections of the multiplexer/demultiplexers $12_1 \sim 12_4$. The multiplexer sections concentrate the cells, add tag information TAG, which is for routing purposes, onto the cells and then enter the cells into the ATM switch. The ATM switch unit switches a cell to a prescribed path by referring to this tag information TAG. The demultiplexer sections of the multiplexer/demultiplexers demultiplex the cells and enter the cells into the prescribed line interfaces upon referring to the tags. The line interfaces $11_{11} \sim 11_{4n}$ convert the cells, which have the cell format of the interior of the switch and enter from the demultiplexer sections of the multiplexer/demultiplexers $12_1 \sim 12_4$, to cells having the ATM cell format, map these ATM cells to the payload of a SONET frame and send the ATM cells to the line side.

Figure 2:
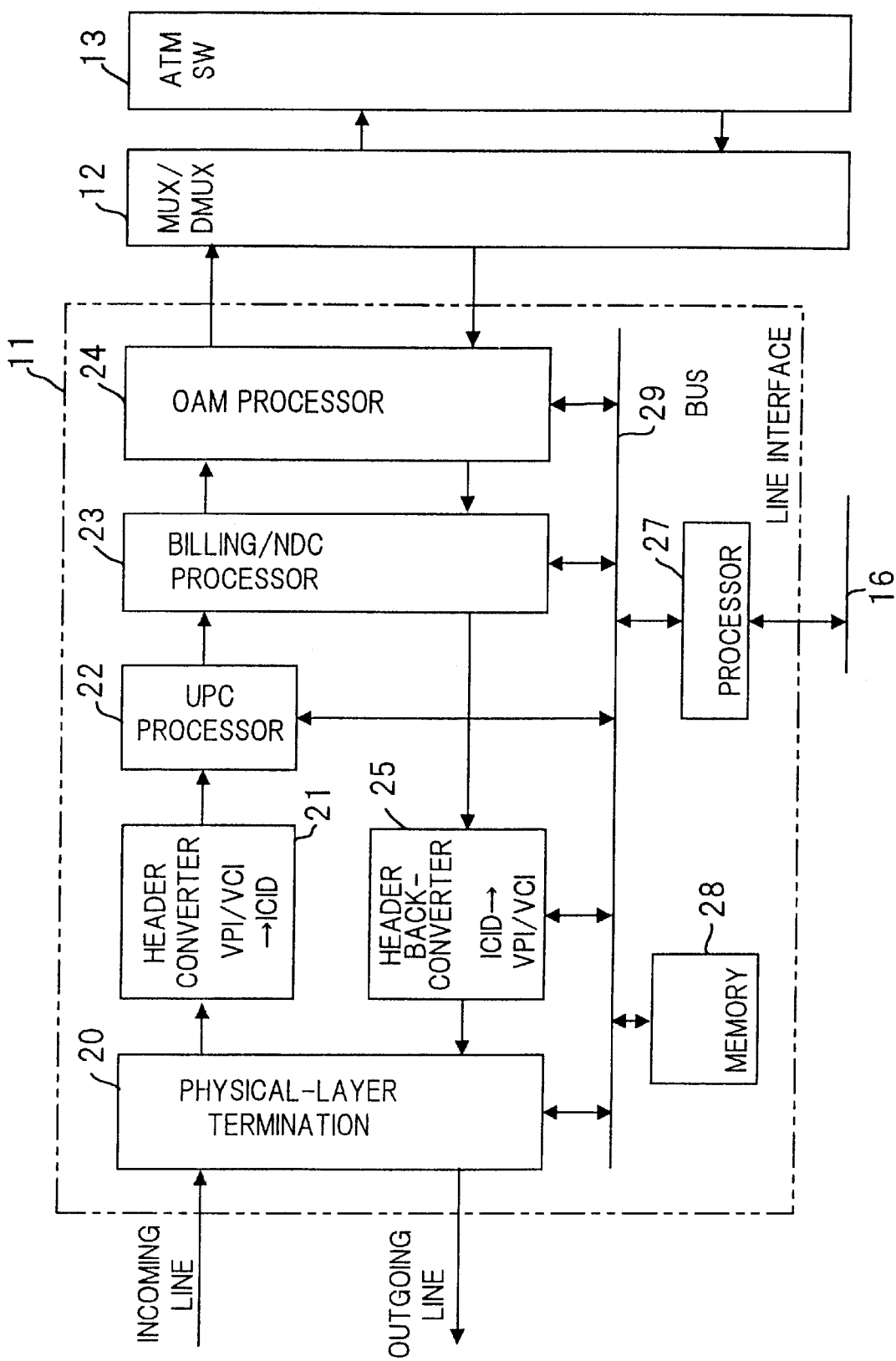
FIG. 2 is a block diagram showing the construction of a line interface (discrete unit)

FIG. 2 is a block diagram illustrating the construction of a line interface. One line interface 11 is provided in correspondence with one set of outgoing/incoming lines. The multiplexer/demultiplexer (MUX/DMUX) and ATM switch are shown at 12 and 13, respectively.

The line interface 11 includes a physical termination 20 for outputting a frame signal, which has a predetermined format, in the form of a cell stream, and for sending a cell stream, which has entered from the side of the ATM switch, to the corresponding line in the form of a frame signal having the aforementioned format. In a case where the line (transmission path) is constituted by an optical cable, the physical terminal 20 has an optoelectric converter for converting an optical signal to an electric signal, an electro-optic converter for converting an electric signal to an optical signal, and a SONET termination. The SONET termination deletes overhead (section overhead SOH and path overhead POH) from a frame signal having a SONET OC3C (156 Mbps) format, extracts ATM cells from the payload PL and subsequently converts the format of the cells to the cell format of the switch interior before outputting the cells. Further, the physical termination 20 maps a cell stream that has entered from the side of the ATM switch to the payload PL of the SONET OC3C format and sends the cell stream to the line.

A header converter 21 converts a VPI/VCI, which has been appended to a cell, to an internal channel identifier (ICID). A UPC processor 22 monitors the cell inflow rate for every ICID. When cells in excess of the reported value flow in, the UPC processor 22 executes processing for discarding cells in contravention of the stipulation. A billing/NDC processor 23 performs billing control and NDC control by counting the number of passing ATM cells for every internal channel identifier ICID and creating billing data and traffic data. An OAM processor 24 identifies OAM cells and implements a fault management function for discriminating and notifying of a line failure, and a performance management function for notifying of error rate of user information cells, cell loss rate and cell mixing ratio. Header back-converter 25 converts an internal channel identifier ICID back to the VPI/VCI.

A processor 27 sends and receives data to and from the central controller 14a of the system controller 14 via the bus 16 and controls each of the components that constitute the line interface 11. A memory 28 stores various data and programs (firmware). A bus line 29 interconnects the above-mentioned components.

(c) CTP State

A line interface (discrete unit) is one transit unit of a path in a case where a path is established between one subscriber and another. A transit point on the discrete unit of the path is referred to as a CTP (Connection Terminating Point). More specifically, if a path residing on a discrete unit is a VPC (VP connection), then it has a CTP of F4 flow. If a path residing on a discrete unit is a VCC (VC connection), then it has a CTP of F5 flow. Passage of a cell becomes possible by performing UPC control on this CTP. In addition, billing control, NDC control and OAM control, etc., can be realized by operating each application on this CTP.

A path which traverses a discrete unit is distinguished by its channel identifier, and a CTP is established for every path (channel identifier) on a discrete unit.

Figure 3:
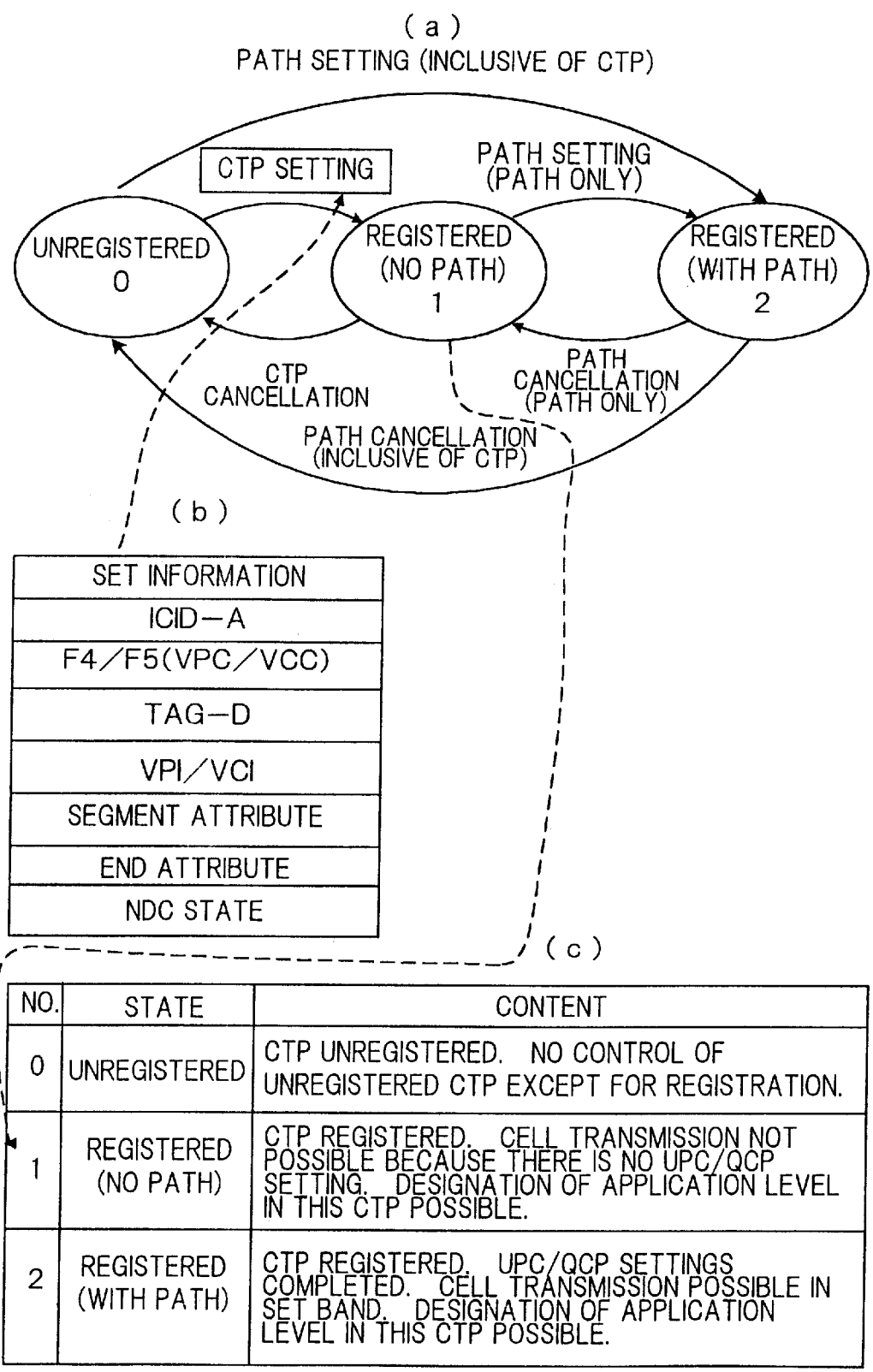
FIG. 3 is a diagram useful in describing a CTP state.

There are three possible CTP states, namely an unregistered state 0, a registered state 1 (no path) and a registered state 2 (with path), as shown in (a) of FIG. 3. There is a transition from one state to another in dependence upon a CTP set/cancel command and a UPC set/cancel command from central controller 14a.

As shown in (c) of FIG. 3, the unregistered state 0 is a state in which CTP is unregistered. In this state, original control of the discrete unit is not possible. The registered state 1 (no path) is a state in which a CTP has been set and UPC has not. Since UPC has not been set, transmission of cells is not possible and all cells are discarded. Since a CTP has been set, however, control at the application level is possible. The registered state 2 (with path) is a state in which both a CTP and UPC have been set. Since UPC has been set, transmission of cells within the reported band is possible. Moreover, control at the application level is possible.

To change from the unregistered state 0 to the registered state 1 (no path), the following settings are made for each path [see (b) of FIG. 3]:

(1) an internal channel identifier ICID-A of a cell that traverses the path;

(2) an F4/F5 distinction;

(3) an identification TAG-D of the line on which the path is present;

(4) VPI/VCI of cell that traverses the path;

(5) a segment attribute (setting of segment attribute at CTP; two types: terminus/repeater);

(6) an END attribute (setting of END attribute at CTP; two types: terminus/repeater); and (7) NDC state (setting of various information in NDC control).

Further, to change from the registered state 1 to the registered state 2, the central controller 14a enters the internal channel identifier ICID-A and reported band, etc., for every path and sets UPC. The setting of UPC is carried out by setting the reported band when ICID-A is assigned to a new call by call processing.

Thus, the central controller 14a sets CTP, UPC in the discrete unit 11. In addition, the central controller 14a stores, in the memory 14b in correspondence with internal channel identifiers ICID-A, indications as to whether CTP and UPC have been set or not, as shown in FIG. 4A. The processor 27 of the discrete unit 11 also stores, in the memory 28 in correspondence with internal channel identifiers ICID-A, indications as to whether CTP and UPC have been set or not, as shown in FIG. 4C. In this case, the memories 14b, 28 store data in a bitmap format.

Figure 5:
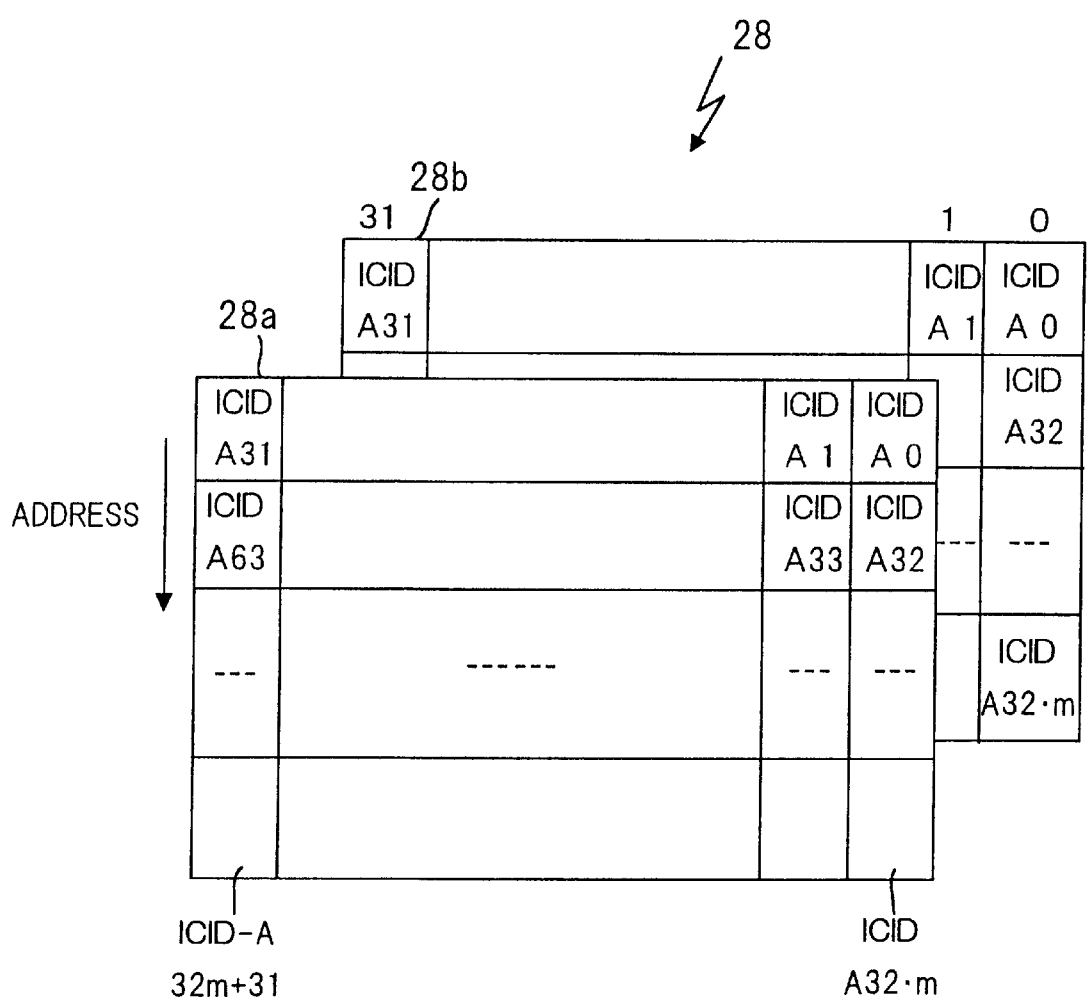
FIG. 5 is a diagram useful in describing storage of data in a bitmap format.

FIG. 5 is an explanatory view for a case where data is stored in the memory 28 in a bitmap format. The memory 28 has a CTP storage area 28a and a UPC storage area 28b. Each bit of each address of the memory, in which one address is composed of 32 bits, is allocated to an internal channel identifier. That is, the bits are allocated to ICID-A0, ICID-AL, ICID-A2, . . . ICID-An (n=32m+31). The indication ("1", "0") as to whether the CTP of ICID-A has been set or not is stored at each bit of the storage area 28a, and the indication ("1", "0") as to whether the UPC of ICID-A has been set or not is stored at each bit of the storage area 28b.

(d) Multiplexer/Demultiplexer (Common Unit)

Figure 6:
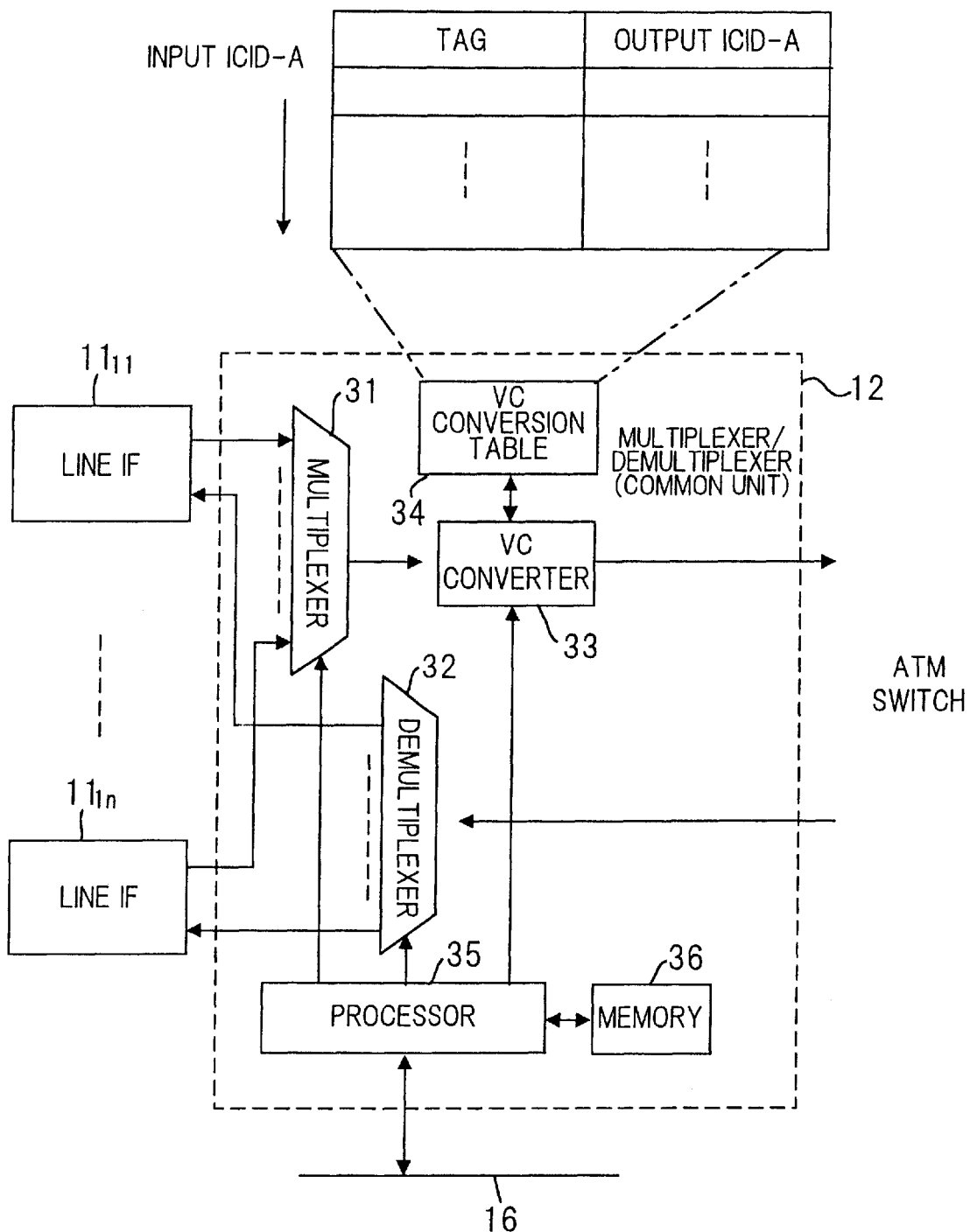
FIG. 6 is a diagram showing the construction of a multiplexer/demultiplexer (common unit)

FIG. 6 is a diagram showing the construction of the multiplexer/demultiplexer (common unit) 12. The multiplexer/demultiplexer includes a multiplexer 31 for multiplexing cell streams, which are output from the plurality of line interfaces $11_{11}$~$11_{1n}$, and entering the cells into the ATM switch 13, a demultiplexer 32 for demultiplexing cells, which have been switched by the ATM switch 13, per each line interface and entering the cells into the line interfaces $11_{11}$~$11_{1n}$, a VC (Virtual Channel) converter 33 for adding a routing tag onto the header of an input cell and replacing an internal channel identifier ICID-A (input ICID-A) contained in the header with another ICID-A (output ICID-A), a VC conversion table (VCC table) 34 for storing tags and output internal channel identifiers ICID-A in correspondence with input internal channel identifiers ICID-A, a processor 35 for controlling the overall multiplexer/demultiplexer, and a memory 36 for storing data and programs (firmware). The processor 35 is adapted to send and receive data to and from the central controller 14a in the system controller 14 via the bus 16.

Tags TAG and output internal channel identifiers ICID-A are registered in the VC conversion table 34 in correspondence with the internal channel identifiers ICID-A (input internal channel identifiers ICID-A) of new calls. These are deleted from the table in response to the end of a call. More specifically, the central controller 14a allocates a VPI/VCI to a new call by call processing control at the time of an outgoing call, converts this VPI/VCI to an internal channel identifier ICID-A, decides a tag and an output ICID-A in correspondence with this ICID-A (input ICID-A) and sends the tag and output ICID-A to the common unit 12. The processor 35 of the common unit 12 sets these in the VC conversion table 34 and stores the fact that the abovementioned ICID-A has been set in the VC conversion table 34 in the memory 36 in the form of a bitmap (see FIG. 4B). Further, in concurrence with the foregoing operation, the central controller 14a inputs the ICID-A of the call and the reported band thereof to the discrete unit 11 and establishes UPC. Accordingly, whether or not a certain ICID-A has been set in the VC conversion table 34 (whether or not the VCC table setting has been made) and whether or not the reported band of the ICID-A has been set in the discrete unit (whether or not the UPC setting has been made) are identical in content.

If the call has ended, the central controller 14a inputs the ICID-A of this call and the end of call to the common unit 12 and discrete unit 11 and cancels these settings.

(e) Path Audit of Common Unit

Figure 7:
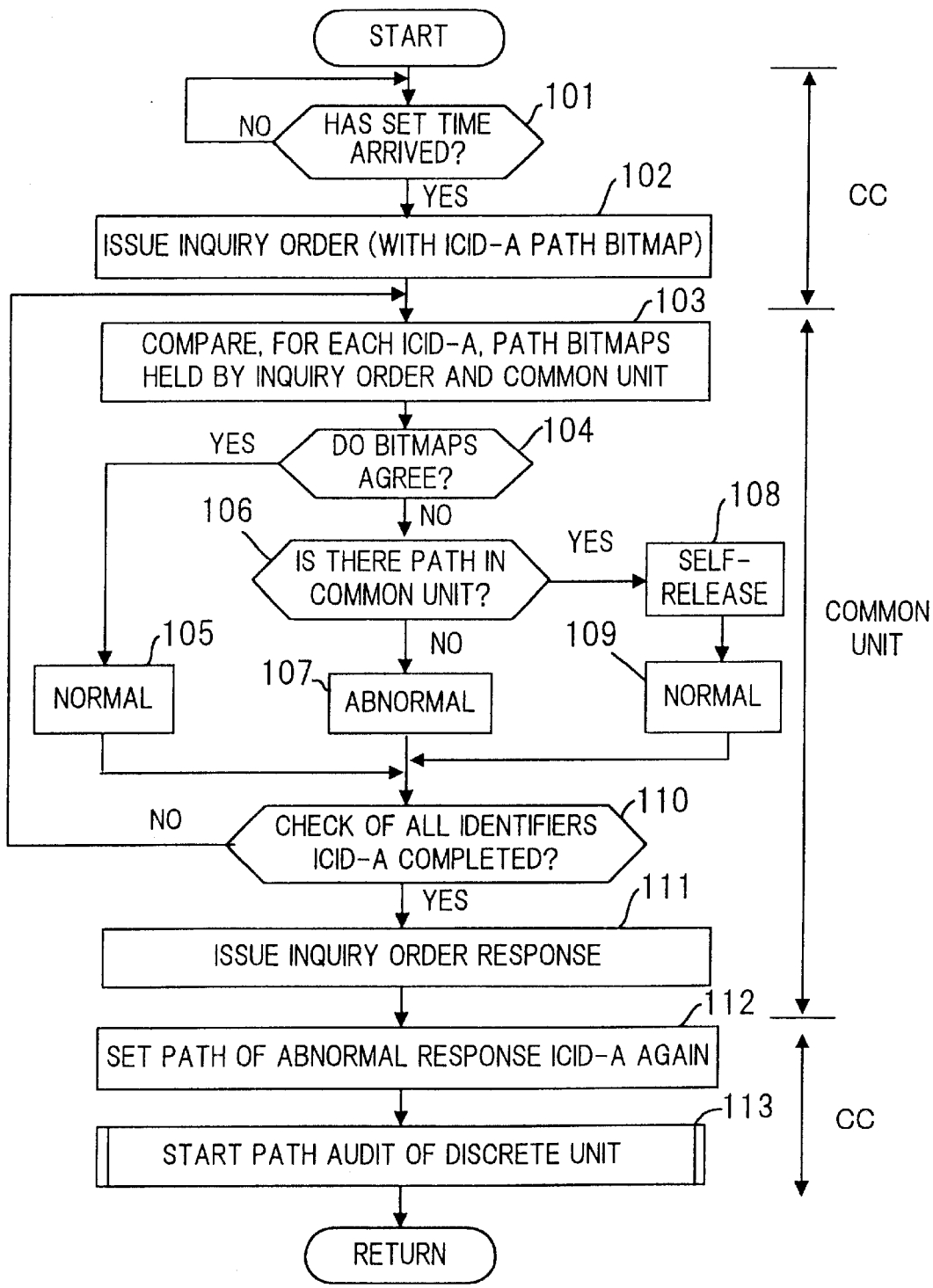
FIG. 7 is a flowchart showing path audit processing of a common unit.
Figure 8:
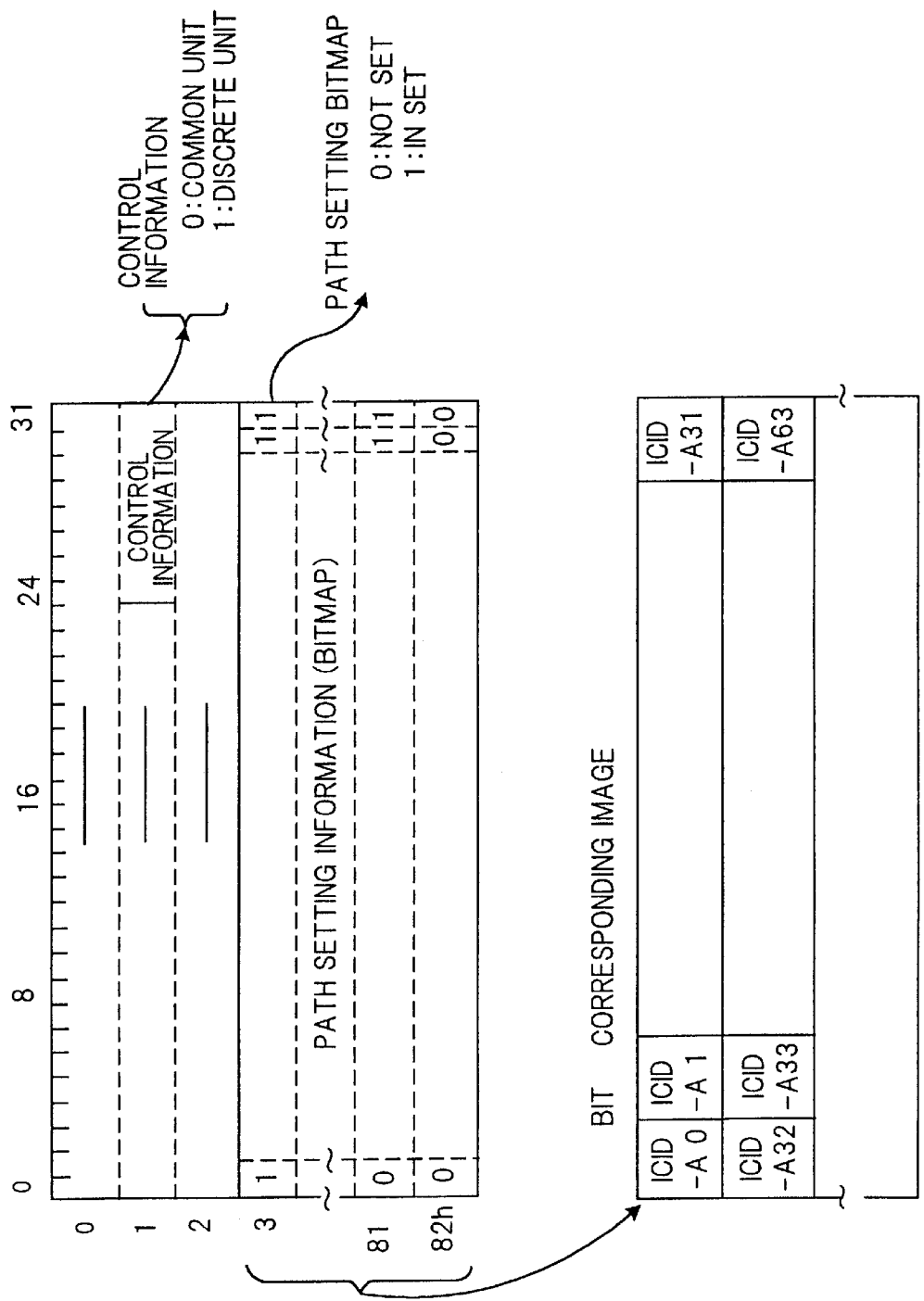
FIG. 8 is a diagram useful in describing an inquiry order.
Figure 9:
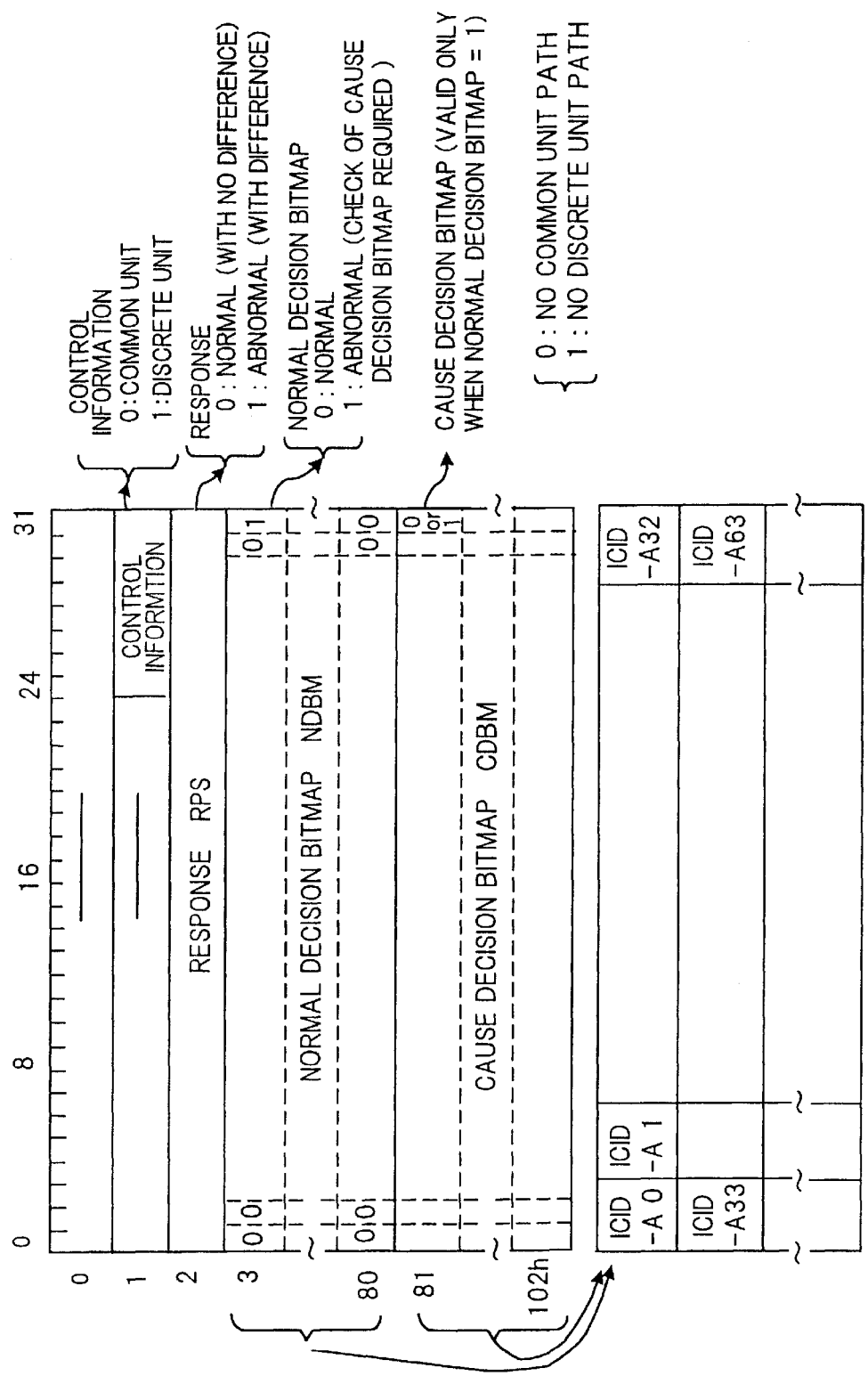
FIG. 9 is a diagram useful in describing a response to the inquiry order.

FIG. 7 is a flowchart showing path audit processing of a common unit carried out periodically, FIG. 8 is a diagram useful in describing an inquiry order, and FIG. 9 is a diagram useful in describing a response to the inquiry order.

The central controller 14a checks to determine whether a set time at which path audit processing is to be executed has arrived (step 101). If the time has arrived, then the central controller 14a sends the common unit an inquiry order in which information indicating the path setting state has been furnished in a bitmap format (step 102). FIG. 9 is for describing the inquiry order. An internal channel identifier ICID-A and an indication (path setting state) of whether the VCC table has been set or not are provided in a bitmap format.

If the inquiry order has been received, the processor 35 of the common unit 12 compares, for every internal channel identifier ICID-A, its own bitmap information (FIG. 4B) and the bitmap information that has been sent from the central controller 14a (step 103). If the VCC setting states (path setting states) of the ICID-A of interest agree, then the situation is normal and the corresponding bit of a normal decision bitmap NDBM in the inquiry order response (see FIG. 9) is made "0" (steps 104, 105).

In case of non-agreement, it is determined whether the path setting (VCC table setting) has been made in the memory 36 of the common unit 12 (step 106). If the result of the determination is that a path has not been set, then the situation is abnormal, the corresponding bit of a normal decision bitmap NDBM in the inquiry order response (see FIG. 9) is made "1" and the corresponding bit of a cause decision bitmap CDBM is made "0" (step 107).

If it is found at step 106 that a path setting has been made, i.e., if the fact that a path has not been set by the central controller 14a but that a path has been set in the common unit 12 has been stored, the processor 35 deletes the VCC setting of the ICID-A of interest from the VC conversion table 34 and makes the path setting in the memory 36 "0" (self-release; step 108). The processor 35 thenceforth makes "0" the corresponding bit of the normal decision bitmap NDBM in the inquiry order response (see FIG. 9) (step 109).

The processor 35 then checks to see whether the checking of all internal channel identifiers ICID-A has been completed (step 110). If the answer is "NO", then the processing from step 103 onward is executed again for the next ICID-A. If the checking of all internal channel identifiers ICID-A has been completed, then the processor 35 enters normal/abnormal in a response field RPS of the inquiry order response (FIG. 9), based upon whether all internal channel identifiers ICID-A are normal or not, and sends the inquiry order response to the central controller 14a (step 111).

Upon receiving the inquiry order response, the central controller 14a checks to see whether it is an abnormal response or not. In case of an abnormal response, i.e., if an ICID-A for which the setting of the VCC table has not been performed normally exists, then the tag and the output ICID-A are set in the common unit 12 again in regard to this ICID-A (step 112). Thereafter, or in case of a normal response, the path audit of the discrete unit is started (step 113).

FIG. 10 is a diagram useful in describing path audit processing in regard to the common unit. This indicates the kind of response and processing adopted in dependence upon whether or not there is a path setting held by the central controller (CC) 14a and whether or not there is a path setting held by the common unit. More specifically, (1) if an indication as to whether or not there is a path setting held by the central controller 14a and an indication as to whether or not there is a path setting held by the common unit agree, then the common unit 12 makes a normal response. (2) If there is a path setting made by the central controller 14a but no path setting made by the common unit 12, then the common unit 12 makes an abnormal response and resetting of the path is performed by the central controller 14a. (3) If there is no path setting made by the central controller CC but there is a path setting made by the common unit 12, then the common unit 12 self-releases the path setting and makes a normal response.

(f) Path Audit of Discrete Unit

Figure 11:
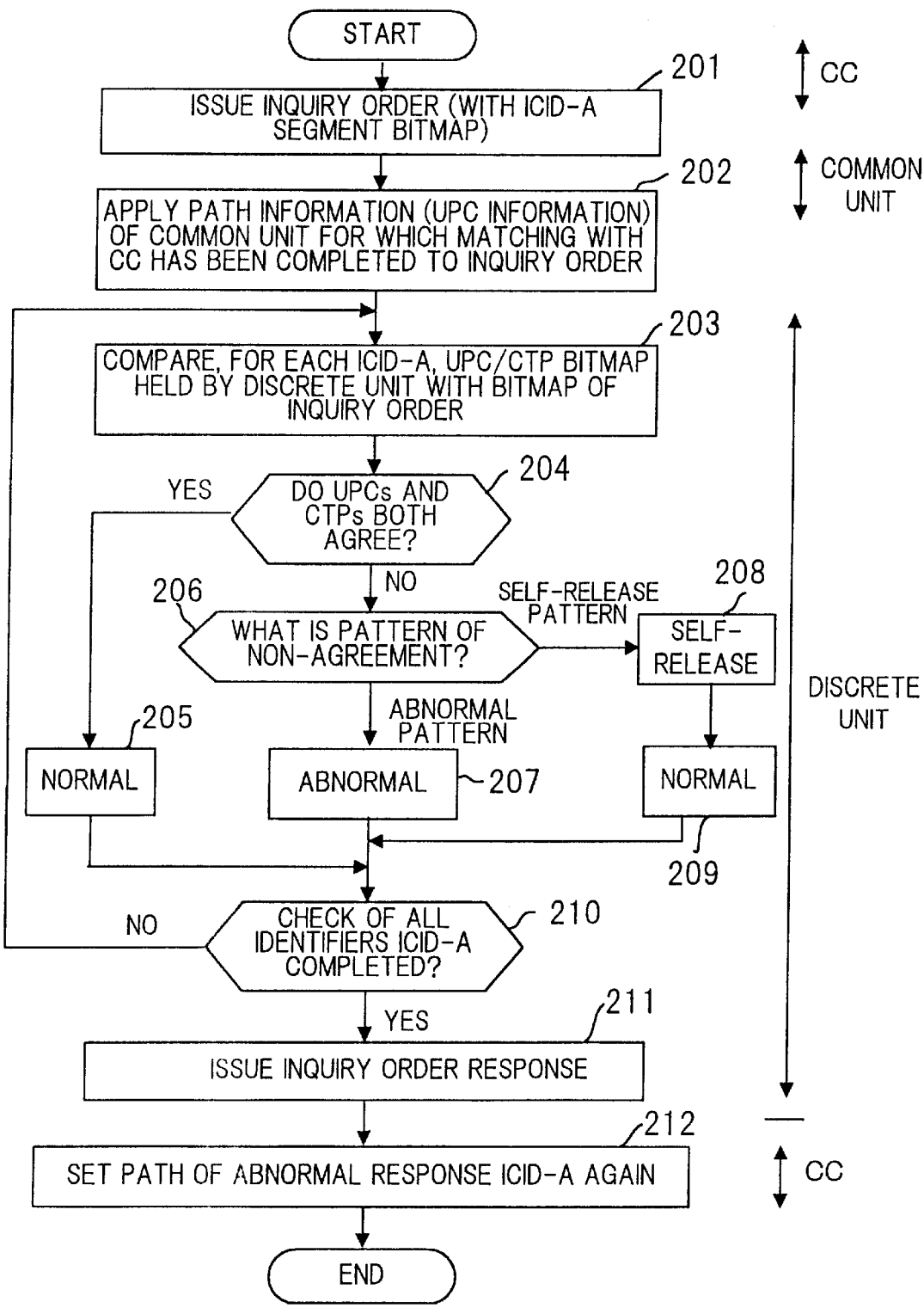
FIG. 11 is a flowchart showing path audit processing of a discrete unit.

FIG. 11 is a flowchart showing path audit processing of a discrete unit.

If path audit processing of the common unit 12 is finished, the central controller 14a sends the common unit 12 an inquiry order furnished with a CTP setting information bitmap (step 201). The common unit 12 adds a path setting information bitmap (UPC setting information bitmap) for which matching has already been performed between the common unit and the central controller 14a onto the inquiry order and then sends the inquiry order to the discrete unit 11 (step 202). It should be noted that the central controller 14a may send an inquiry order, which is furnished with the CTP setting information bitmap and the UPC setting information bitmap, directly to the discrete unit 11.

If the inquiry order has been received, the processor 27 of the discrete unit 11 compares, for every internal channel identifier ICID-A, its own CTP/UPC bitmap information (FIGS. 4C, 5) and the CTP/UPC bitmap information that has been sent to it (step 203). If the CTP setting states and UPC setting states of the ICID-A of interest agree, then the situation is normal and the corresponding bit of the normal decision bitmap NDBM in the inquiry order response (see FIG. 9) is made "0" (steps 204, 205).

If at least one of the CTP, UPC settings fail to agree, then the pattern of this non-agreement is discriminated (step 206) and processing conforming to the non-agreement pattern is executed.

More specifically, (1) if CTP and UPC have both been set in the central controller 14a but at least one of these has not been set in the discrete unit 11, then the situation is judged to be abnormal. (2) If CTP and UPC have both been set in the discrete unit 11, or if neither has been set in the discrete unit 11, when only CTP has been set in the central controller 14a, then the situation is judged to be abnormal in both cases. In case of such abnormalities, the corresponding bit of the normal decision bitmap NDBM in the inquiry order response (see FIG. 9) is made "1" and the corresponding bit of the cause decision bitmap CDBM is made "0" (step 207).

In a case where neither CTP nor UPC has been set in the central controller 14a and at least one of CTP and UPC has been set in the discrete unit 11, the processor 27 of the discrete unit 11 changes the setting of the ICID-A of interest in memory 28 to "0" (self-release; step 208). The processor 27 thenceforth makes "0" the corresponding bit of the normal decision bitmap NDBM in the inquiry order response (see FIG. 9) (step 209).

The processor 27 then checks to see whether the checking of all internal channel identifiers ICID-A has been completed (step 210). If the answer is "NO", then the processing from step 203 onward is executed again for the next ICID-A. If the checking of all internal channel identifiers ICID-A has been completed, then the processor 27 enters normal/abnormal in the response field RPS of the inquiry order response (FIG. 9), based upon whether all internal channel identifiers ICID-A are normal or not, and sends the inquiry order response to the central controller 14a (step 211).

Upon receiving the inquiry order response, the central controller 14a checks to see whether it is an abnormal response or not. Path audit processing is terminated in case of a normal response. In case of an abnormal response, on the other hand, i.e., if an ICID-A for which the CTP setting and UPC setting have not been performed normally exists, then the CTP and UPC settings are performed in the discrete unit 11 in regard to this ICID-A and path audit processing is terminated (step 212).

FIG. 12 is a diagram useful in describing path audit processing in regard to the discrete unit. This indicates the kind of response and processing adopted in dependence upon whether or not there is a UPC/CTP setting held by the central controller (CC) 14a and whether or not there is a UPC/CTP setting held by the discrete unit.

(g) Sequence Conforming to UPC/CTP Setting State of Each Unit

FIG. 13 is a correspondence table showing the correspondence between UPC/CTP setting states, which are held by the system controller (CC), common unit and discrete unit, and sequences.

Figure 14:
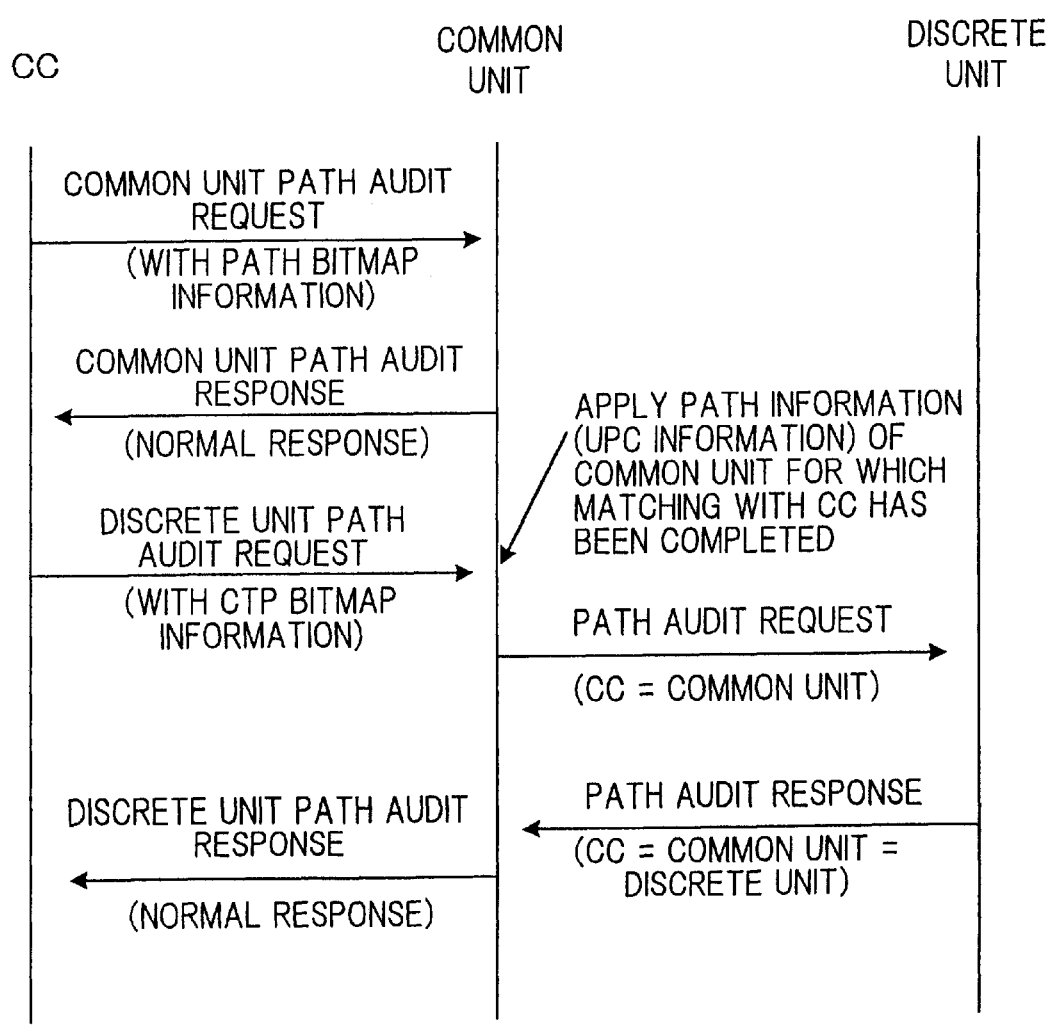
FIG. 14 is a diagram useful in describing a first sequence in path audit processing of common and discrete units.

FIG. 14 is a diagram useful in describing a first sequence in a case where all UPCs and CTPs have been set, or a case where no UPCs and CTPs have been set, in the central controller (CC), common unit and discrete unit.

Figure 15:
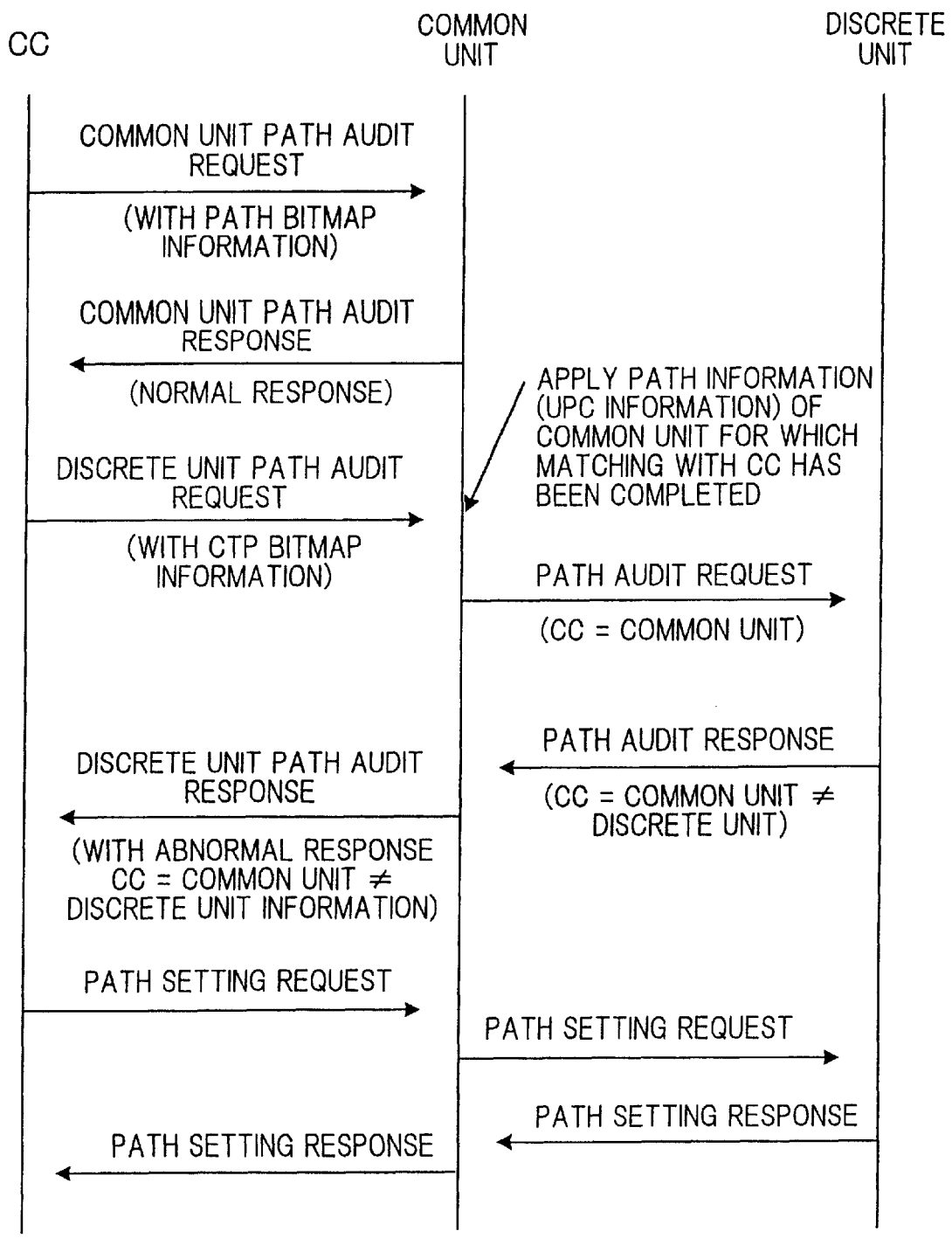
FIG. 15 is a diagram useful in describing second and third sequences in path audit processing of common and discrete units.

FIG. 15 is a diagram useful in describing second and third sequences in a case where UPC has been set in the central controller (CC) and common unit but not in the discrete unit.

Figure 16:
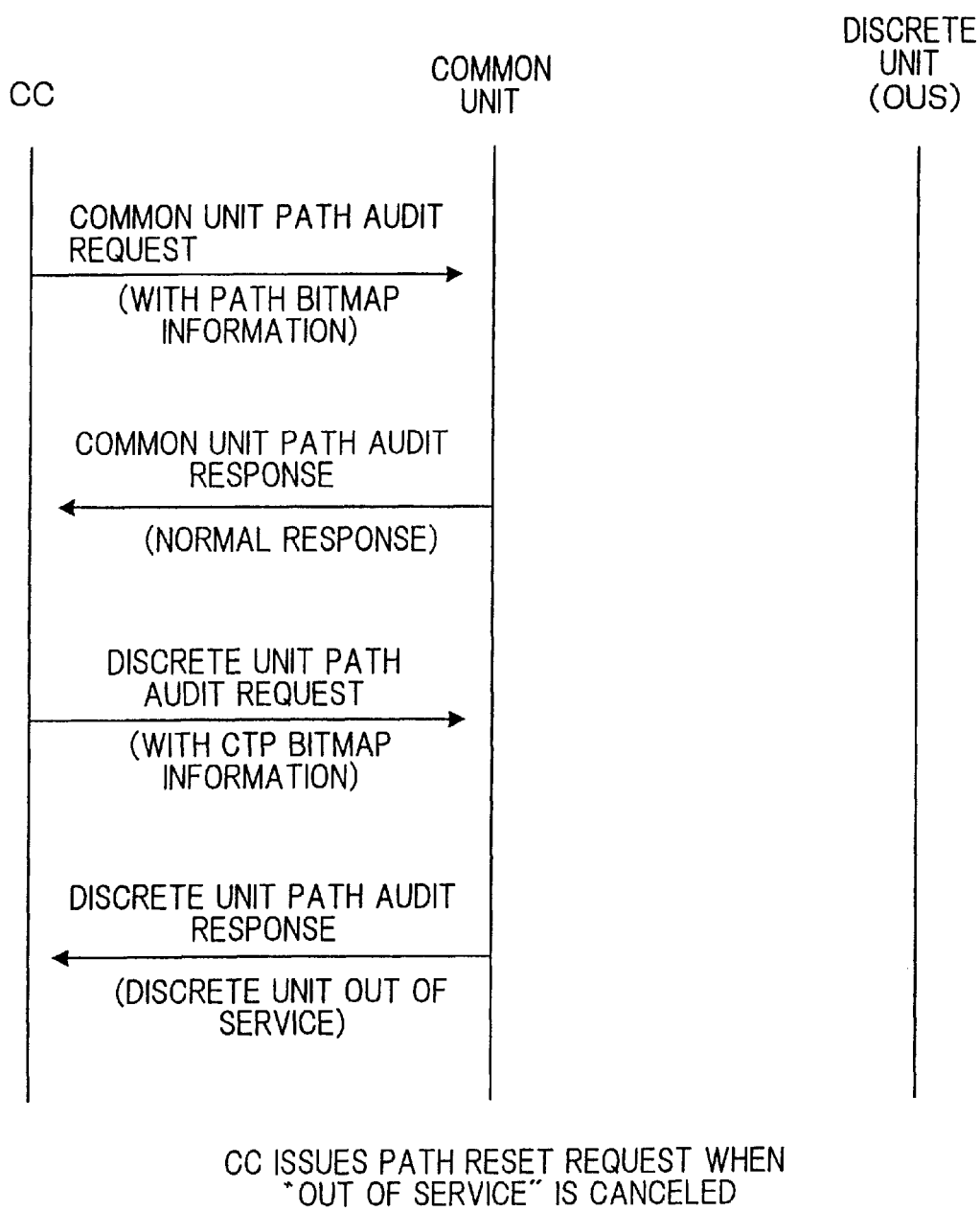
FIG. 16 is a diagram useful in describing second and third sequences in path audit processing of common and discrete units (where the discrete unit is out of service)

FIG. 16 is a diagram useful in describing second and third sequences in a case where UPC has been set in the central controller (CC) and common unit but not in the discrete unit because the discrete unit is out of service.

Figure 17:
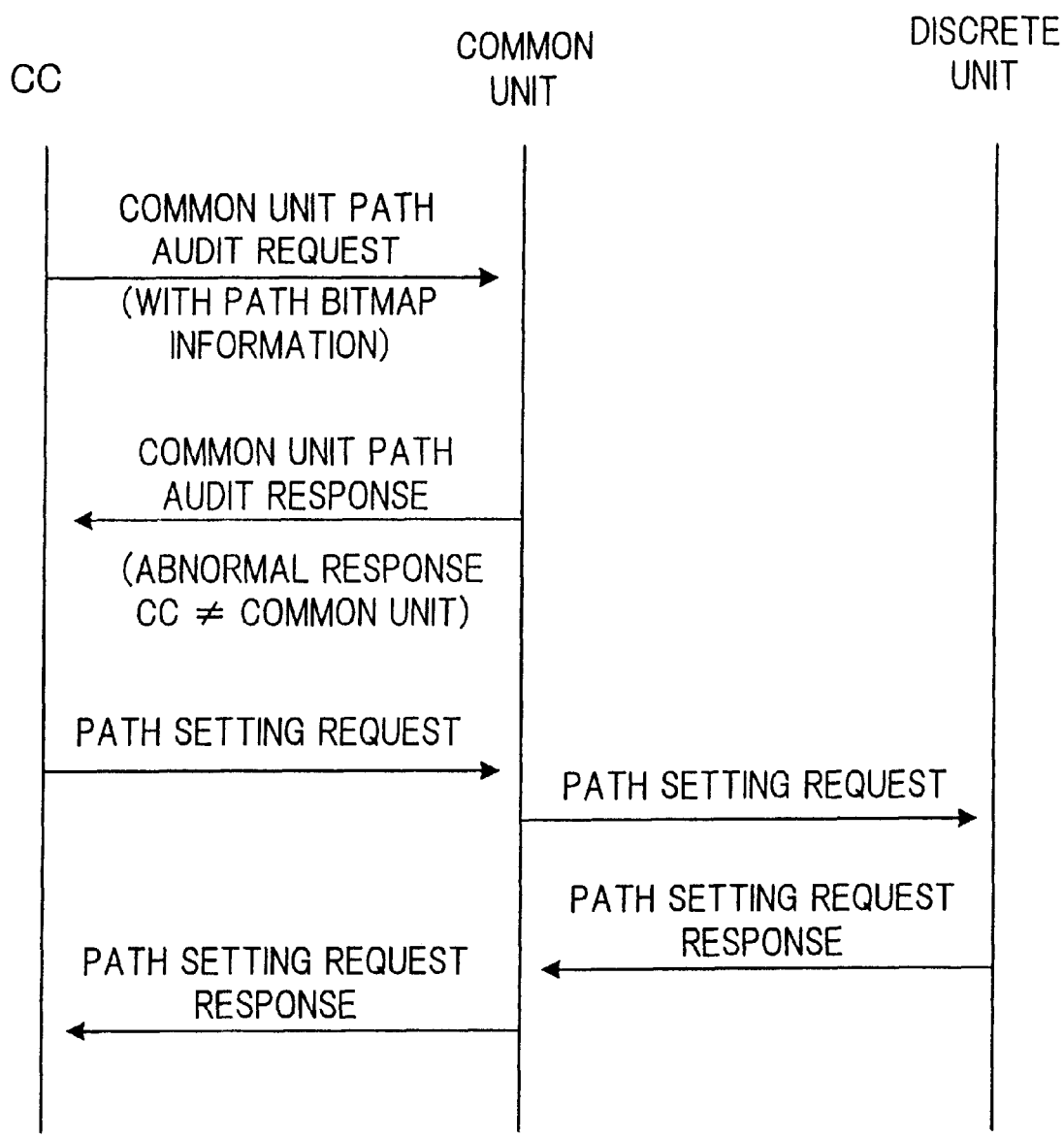
FIG. 17 is a diagram useful in describing a fourth sequence in path audit processing of common and discrete units.

FIG. 17 is a diagram useful in describing a fourth sequence in a case where a UPC setting (path setting) has been performed in the central controller (CC) but not in the common unit.

Figure 18:
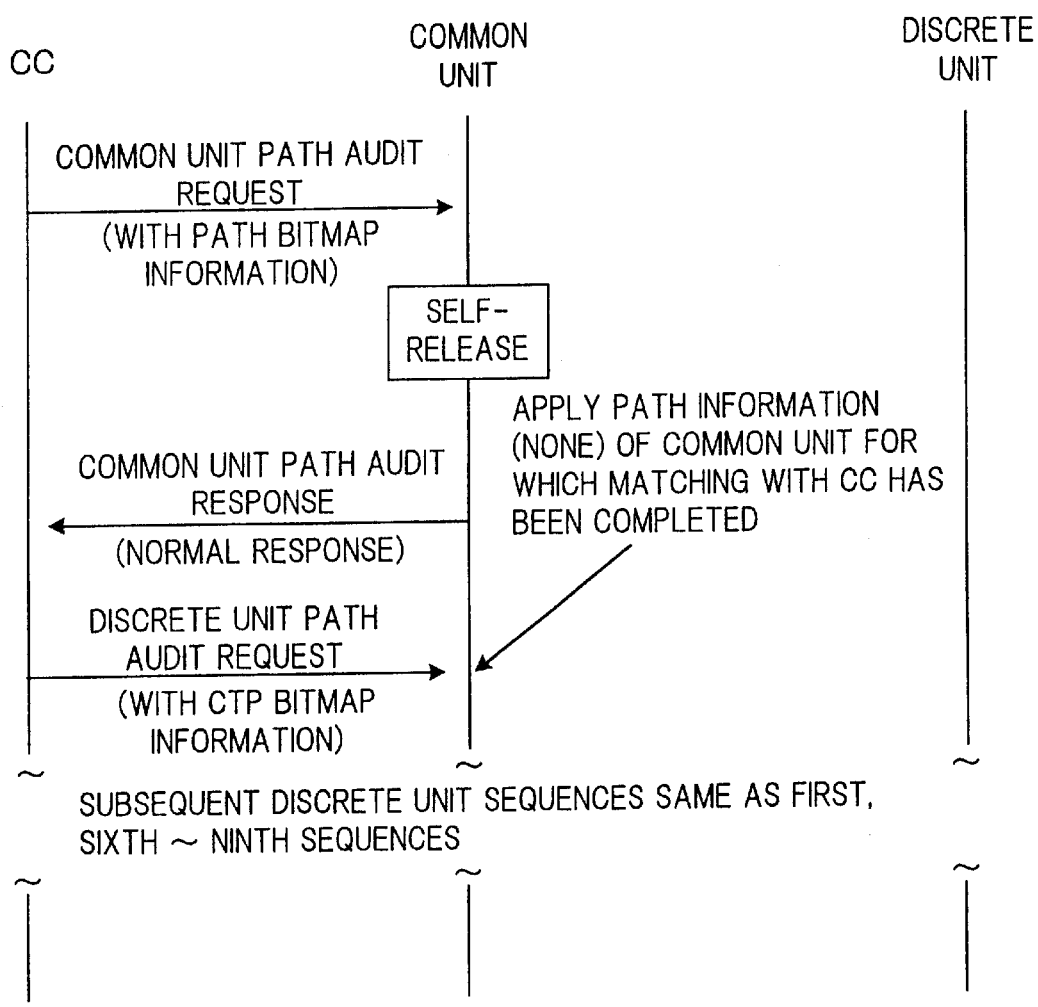
FIG. 18 is a diagram useful in describing a fifth sequence in path audit processing of common and discrete units.

FIG. 18 is a diagram useful in describing a fifth sequence in a case where a UPC setting has not been performed in the central controller (CC) but has been performed in the common unit.

Figure 19:
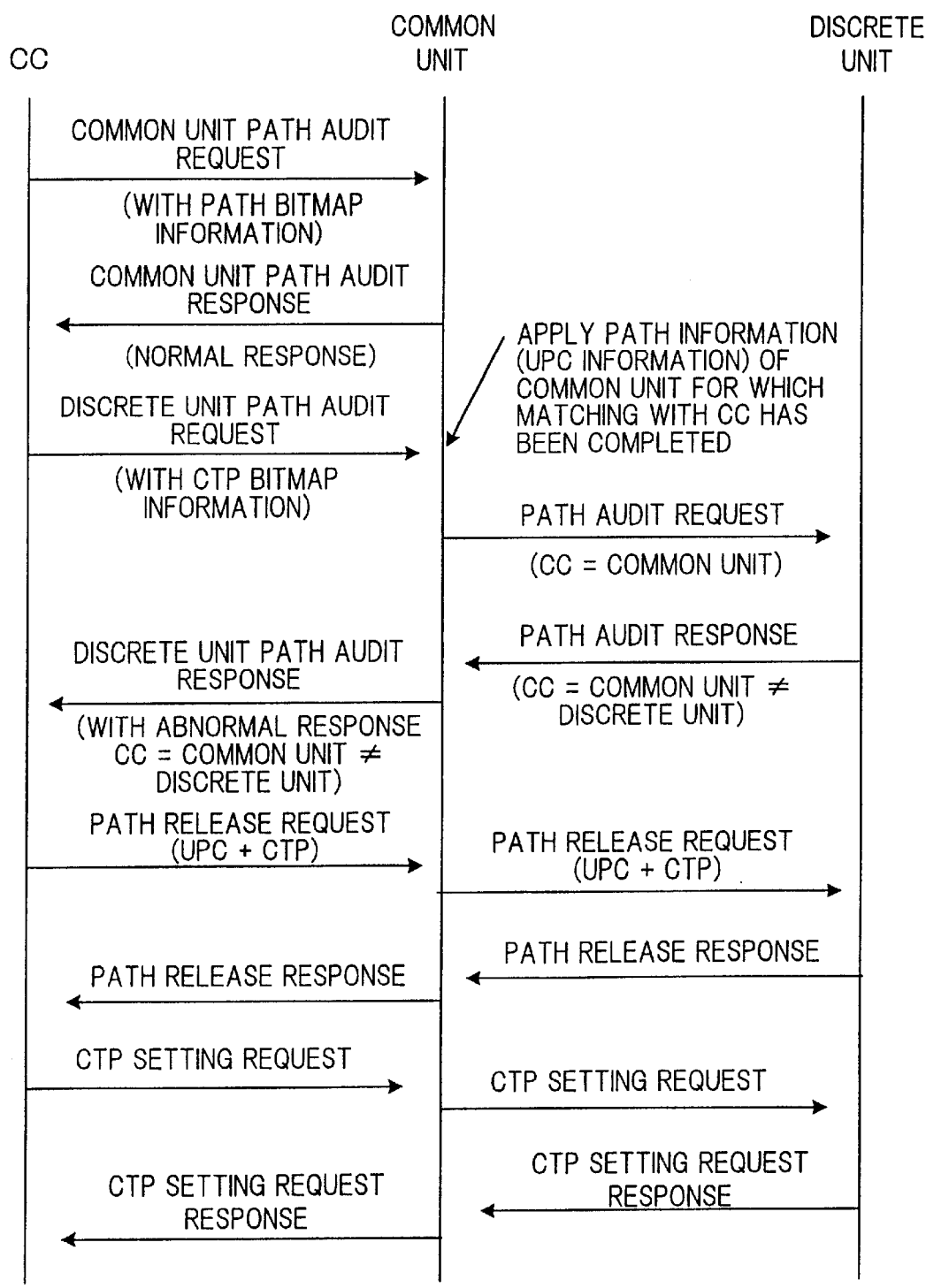
FIG. 19 is a diagram useful in describing a sixth sequence in path audit processing of common and discrete units.

FIG. 19 is a diagram useful in describing a sixth sequence in a case where UPC has not been set in either the central controller (CC) or common unit but UPC/CTP has been set in the discrete unit (CTP has been set by the central controller CC).

Figure 20:
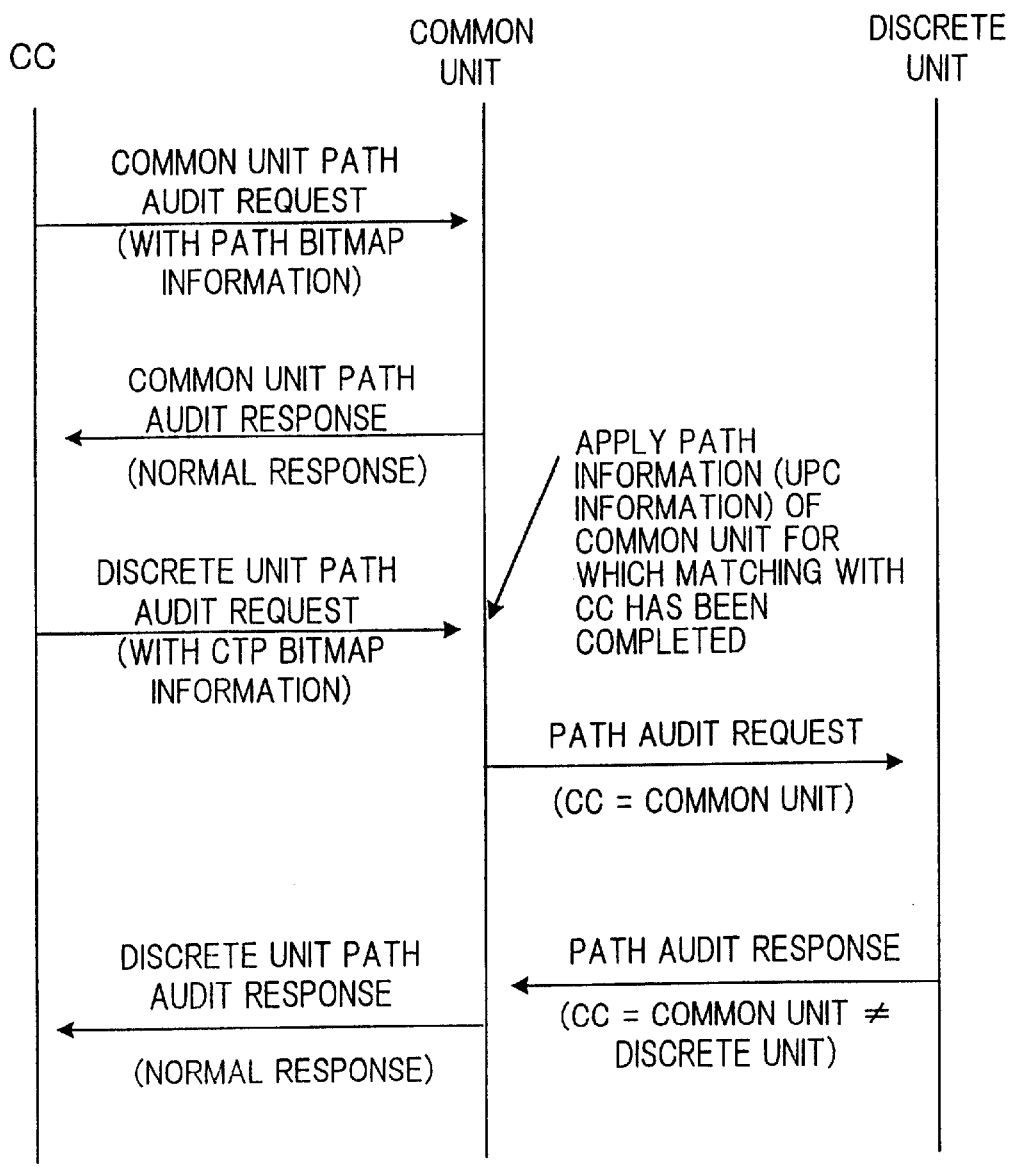
FIG. 20 is a diagram useful in describing a seventh sequence in path audit processing of common and discrete units.

FIG. 20 is a diagram useful in describing a seventh sequence in a case where UPC has not been set in either the central controller (CC) or common unit, UPC has not been set in the discrete unit but CTP has (CTP has been set by the central controller CC).

Figure 21:
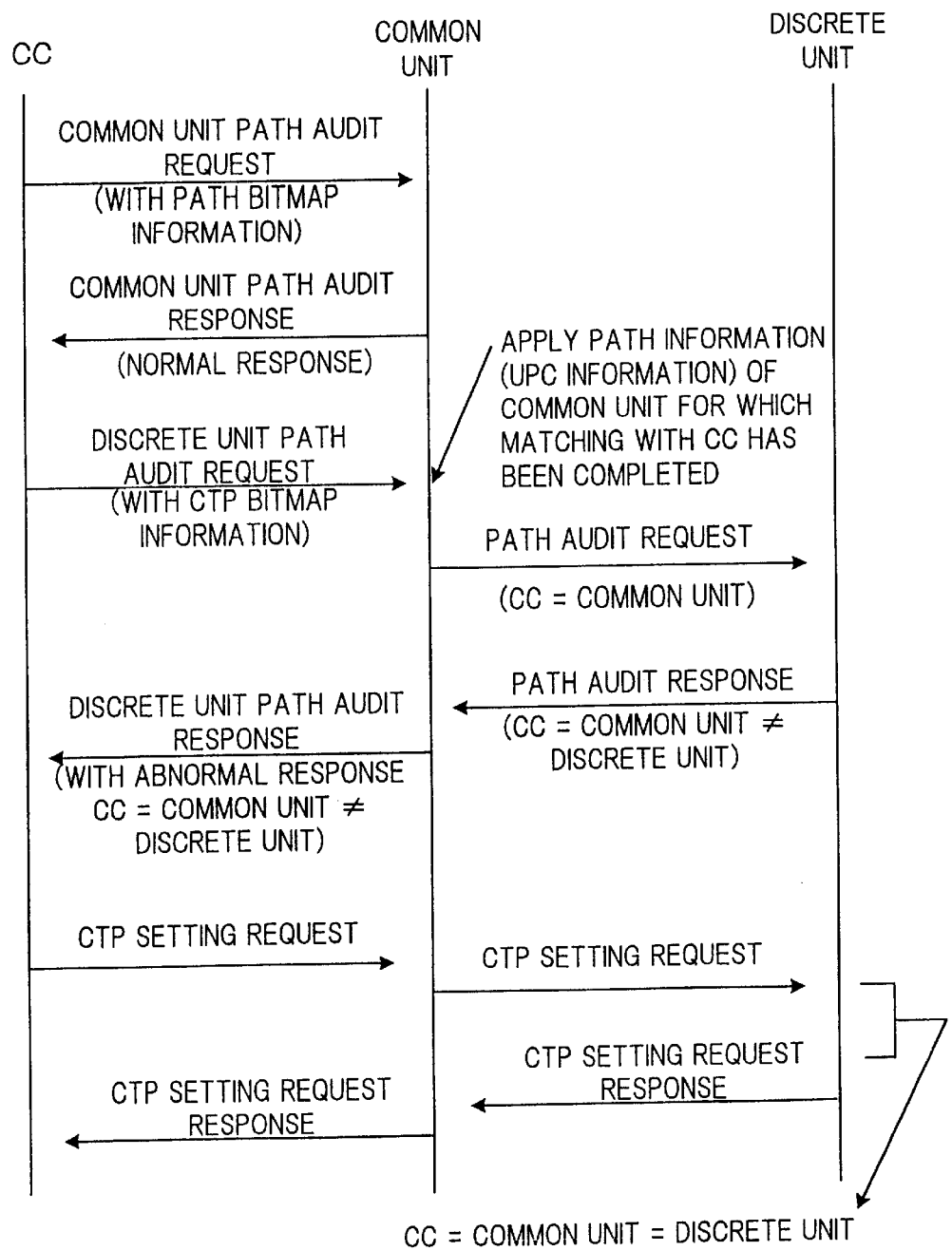
FIG. 21 is a diagram useful in describing an eighth sequence in path audit processing of common and discrete units.

FIG. 21 is a diagram useful in describing an eighth sequence in a case where UPC has not been set in either the central controller (CC) or common unit but both UPC and CTP have been set in the discrete unit: (CTP has been set by the central controller CC).

Figure 22:
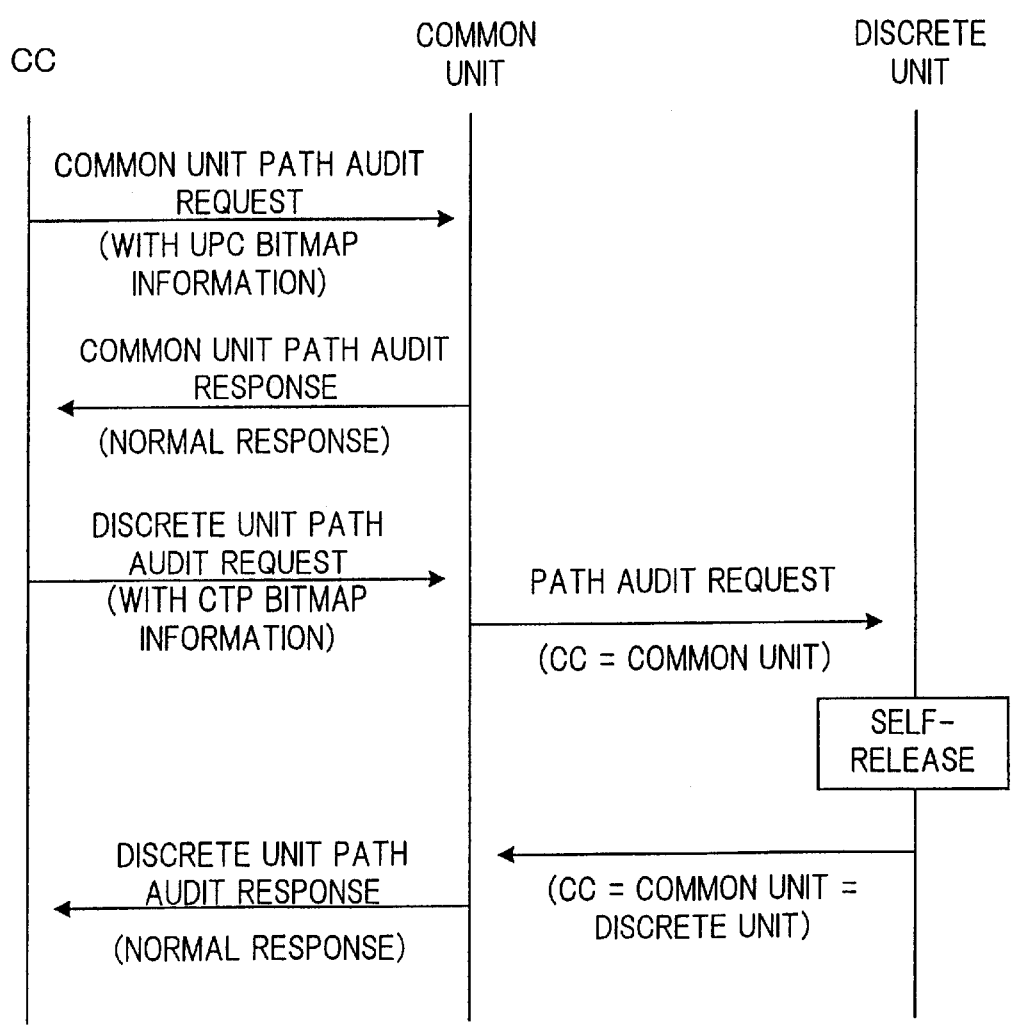
FIG. 22 is a diagram useful in describing a ninth sequence in path audit processing of common and discrete units.

FIG. 22 is a diagram useful in describing a ninth sequence in a case where UPC has not been set in either the central controller (CC) or common unit but UPC or CTP has been set in the discrete unit (CTP has not been set by the central controller CC).

(h) Path Audit of Duplexed System

Figure 23:
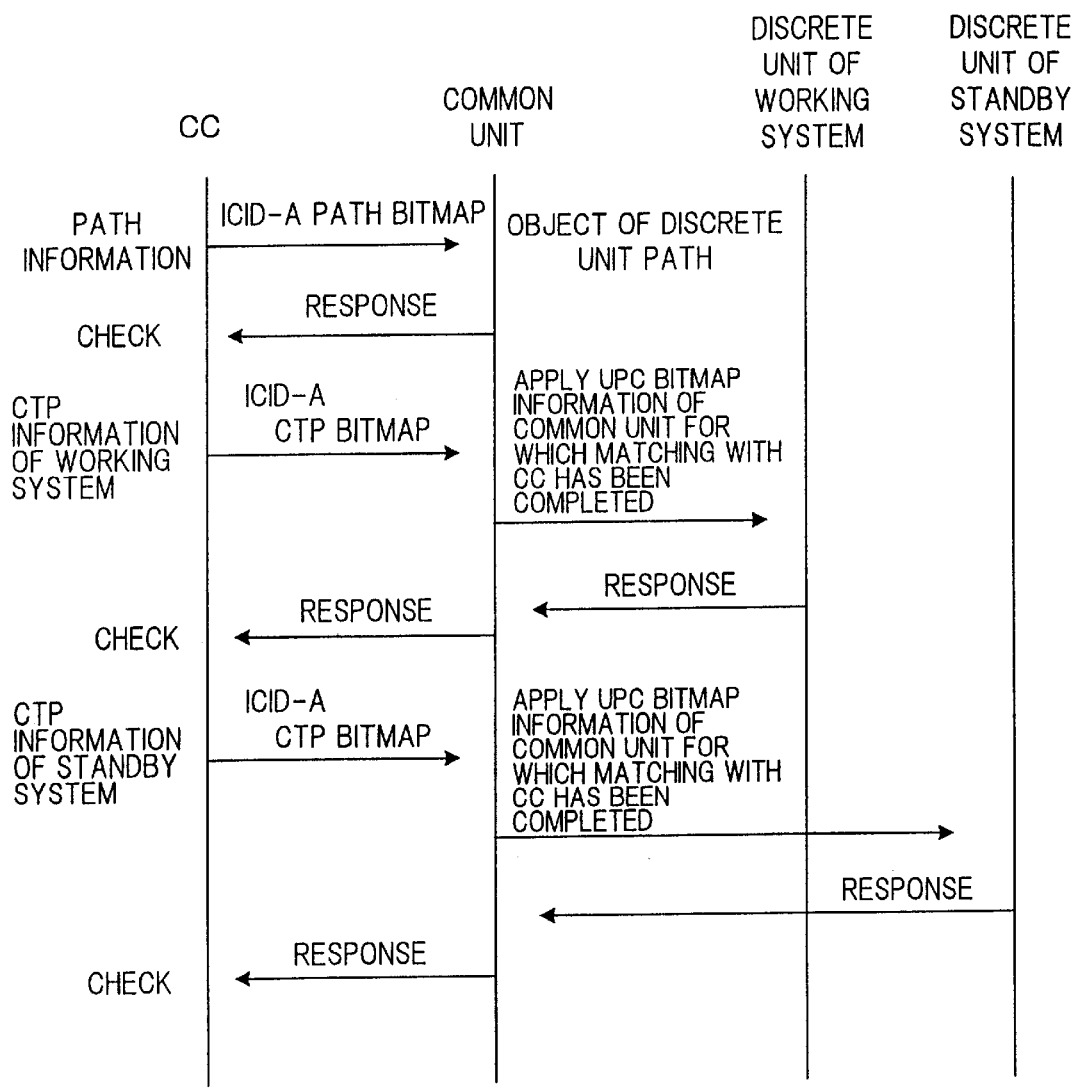
FIG. 23 is a diagram useful in describing the sequence of path audit in a case where a discrete unit is duplex.

FIG. 23 is a diagram useful in describing the sequence of path audit in a case where redundant discrete units are provided. In a duplex system in which there are redundant common or discrete units, the above-described path audit control is executed in the units of both the working and standby (protection) systems. More specifically, path audit processing is executed first in regard to the common unit, then path audit processing is executed in regard to the discrete unit of the working system, and finally path audit processing is executed in regard to the discrete unit of the standby system. Path audit processing in regard to the discrete units of the working and standby systems is executed in accordance with the flowchart of FIG. 11.

By virtue of the path audit processing executed in regard to the common unit, the discrete unit of the working system and the discrete unit of the standby system, (1) there will be a case where the states of the central controller CC and common unit agree, (2) a case where the states of the central controller CC and common unit do not agree and a path (UPC) has been set in the central controller CC, and (3) a case where the states of the central controller CC and common unit do not agree and a path (UPC) has not been set in the central controller CC, as illustrated in FIG. 24.

In case (1), the situation is regarded as being normal and matching processing is not executed if the states of the discrete units of both the working and standby systems both match the state of the central controller CC. However, if the state of one or both of the discrete units of the working and standby systems does not match the state of the central controller CC, the situation is regarded as being abnormal and the central controller CC sets UPC, CTP again in both systems.

In case (2), the central controller CC regards the situation as being abnormal and sets UPC, CTP again in the common unit and in the discrete units of both systems regardless of the states of the discrete units.

In case (3), the common unit and the discrete units of both systems perform self-release and attain states identical with that of the central controller CC, as a result of which the central controller CC regards the situation as being normal and does not execute matching processing.

Figure 25:
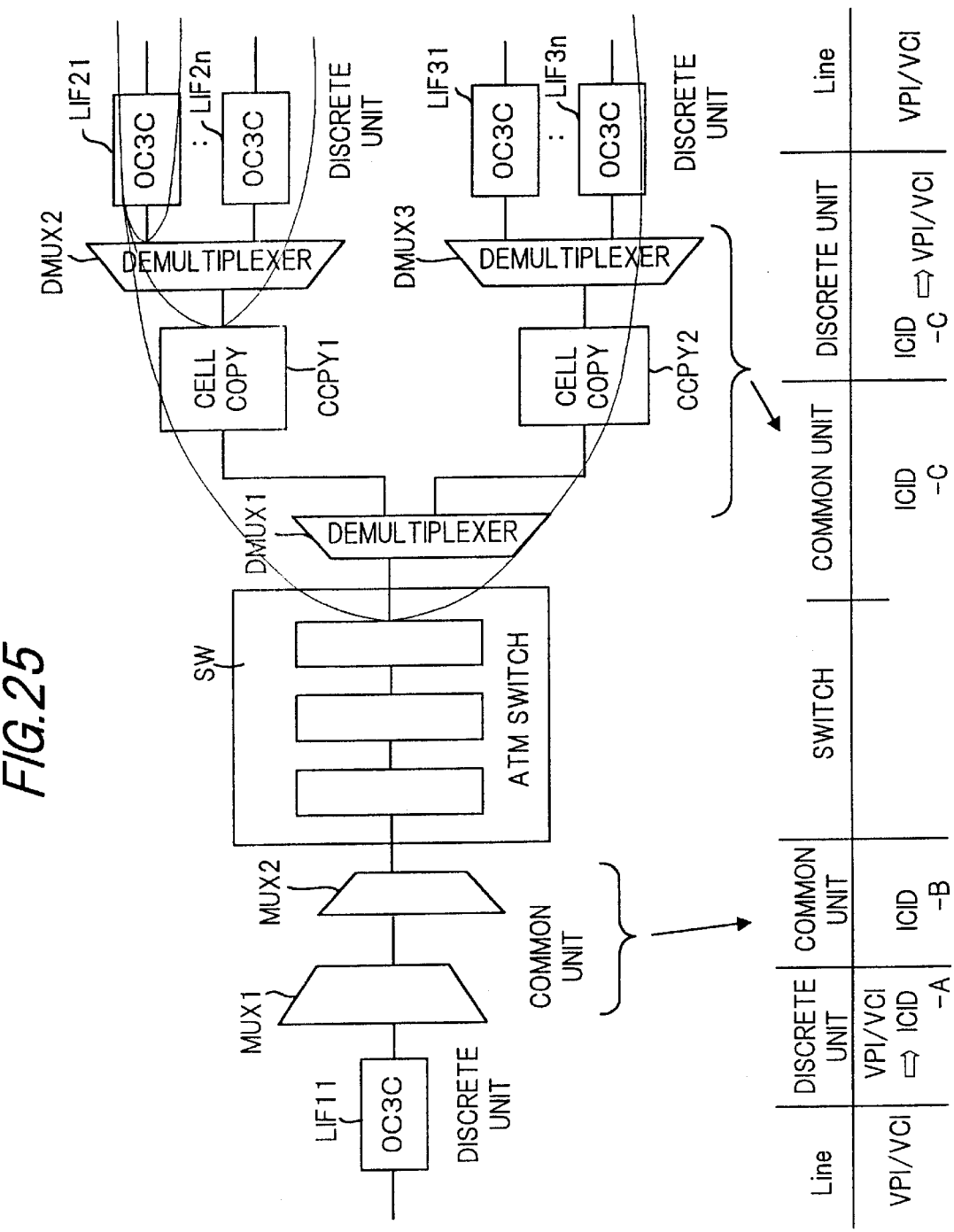
FIG. 25 is a diagram showing the general construction of an ATM switch for multicasting.

(i) Path Audit of ATM Switch in Which Channel Identifiers are Converted a Plurality of Times There are cases where the channel identifiers of cells are converted a plurality of times within an ATM switch to multicast the cells. FIG. 25 is a diagram showing the general construction of an ATM switch for such multicasting. The ATM switch includes discrete units (line interfaces) $LIF_{11}$, $LIF_{21}$~$LIF_{2n}$, $LIF_{31}$~$LIF_{3m}$, multiplexers $MUX_1$, $MUX_2$, demultiplexers $DMUX_1$~$DMUX_3$, an ATM switch SW and cell copying units $CCPY_1$, $CCPY_2$. Multicasting can take on one of three forms, namely (1) a case where multicasting is performed based on tag information the demultiplexer DMUX1 provided on the output side of the ATM switch SW, (2) a case where cells are copied by the cell copiers CCPY1, CCPY2 and multiplexed to plurality of lines, and (3) a case where multiplexing is performed on the same line by the demultiplexers DMUX2, DMUX3 provided at the inputs to he line interfaces on the output side.

In the above-mentioned ATM switch equipped with the multicasting function, a VPI/VCI attached to a cell is (1) converted to the internal channel identifier ICID-A by the discrete unit $LIF_{11}$ on the input side, (2) subsequently degenerated to ICID-B in the multiplexers $MUX_1$, $MUX_2$, (3) degenerated further to ICID-C in the demultiplexer $DMUX_1$ and (4) restored from ICID-C to VPI/VCI and sent to the line by the discrete units on the output side.

First common units which function as the multiplexers $MUX_1$, $MUX_2$ hold, in bitmap form and in regard to each internal channel identifier ICID-C, an indication as to whether a path (UPC) setting has been made. A second common unit which functions as the demultiplexer $DMUX_1$ holds, in bitmap form and in regard to each internal channel identifier ICID-C, an indication as to whether a path (UPC) setting has been made.

Figure 26:
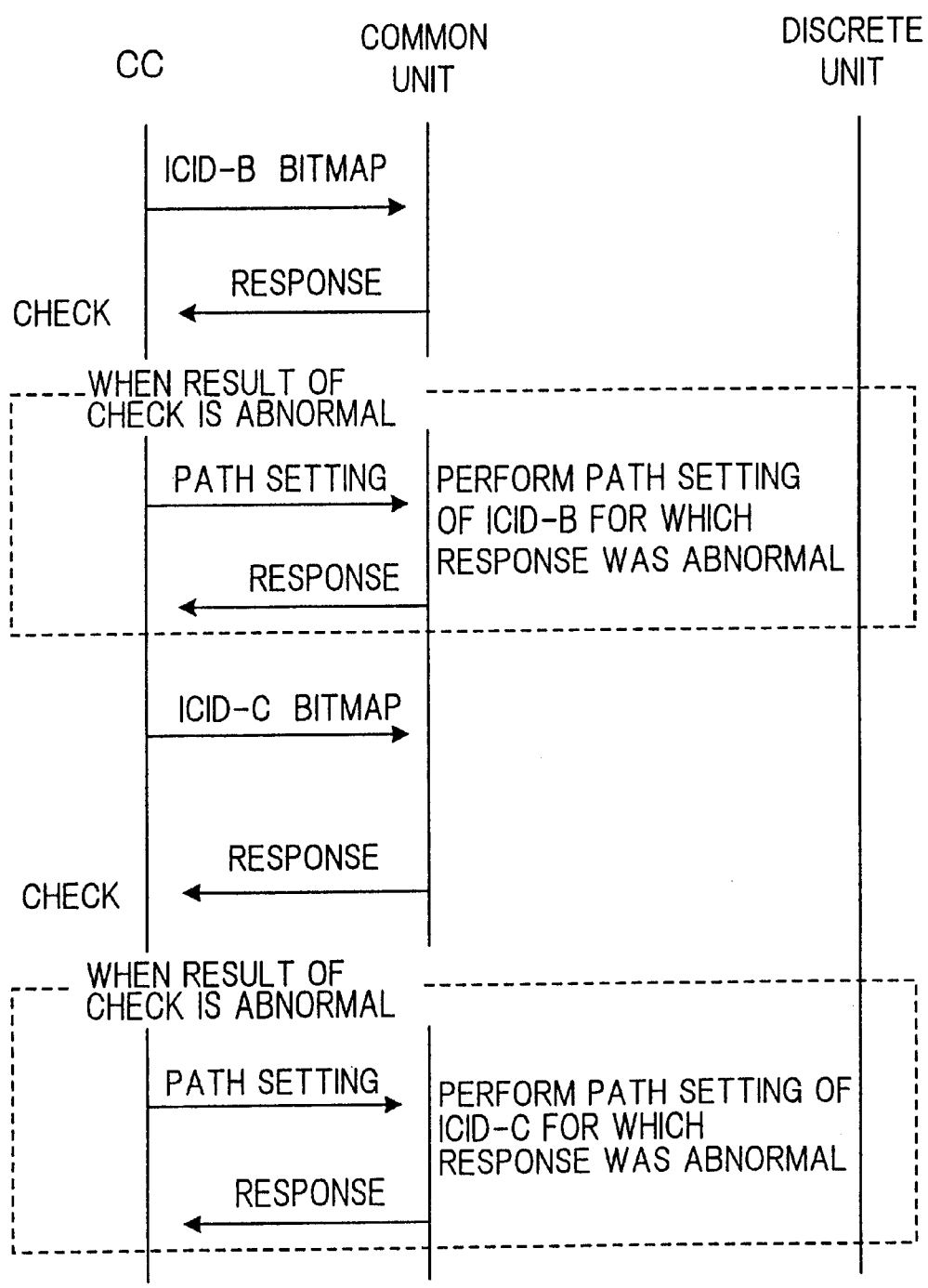
FIG. 26 is a diagram useful in describing the sequence of path audit in an ATM switch for converting channel identifiers a plurality of times.

FIG. 26 is a diagram useful in describing the sequence of path audit in an ATM switch which converts channel identifiers a plurality of times. It should be noted that path audit in regard to the internal channel identifier ICID-A has been completed by an already existing method.

When the path audit is performed, the central controller CC first sends the path setting bitmap information of the internal channel identifier ICID-B to the first common unit. By processing similar to that shown in the flowchart of FIG. 7, the first common unit compares its own path setting bitmap information and the bitmap information that has been sent from the central controller CC and makes an abnormal response or a normal response based upon the result of the comparison. More specifically, (1) if an indication as to whether or not there is a path setting held by the central controller CC and an indication as to whether or not there is a path setting held by the first common unit agree, then the first common unit makes a normal response. (2) If there is a path setting made by the central controller CC but no path setting made by the first common unit, then the common unit makes an abnormal response and resetting of the path is performed by the central controller CC. (3) If there is no path setting made by the central controller CC but there is a path setting made by the common unit, then the common unit self-releases the path setting and makes a normal response.

The central controller CC checks to see whether there is an abnormal response. If there is an abnormal response, then the central controller CC again sets the path of the ICID-B for which the response was abnormal.

If this resetting of the path is finished, or if there is a normal response, the central controller CC sends the path setting bitmap information of the internal channel identifier ICID-C to the second common unit. By processing similar to that shown in the flowchart of FIG. 7, the second common unit compares its own path setting bitmap information and the bitmap information that has been sent from the central controller CC and makes an abnormal response or a normal response based upon the result of the comparison. More specifically, (1) if an indication as to whether or not there is a path setting held by the central controller CC and an indication as to whether or not there is a path setting held by the second common unit agree, then the second common unit makes a normal response. (2) If there is a path setting made by the central controller CC but no path setting made by the second common unit, then the second common unit makes an abnormal response and resetting of the path is performed by the central controller CC. (3) If there is no path setting made by the central controller CC but there is a path setting made by the second common unit, then the second common unit self-releases the path setting and makes a normal response.

The central controller CC checks to see whether there is an abnormal response. If there is no abnormal response, then the central controller CC terminates path audit processing. If there is an abnormal response, on the other hand, then the central controller CC again sets the path (UPC) of the ICID-C for which the response was abnormal and then terminates path audit processing.

FIG. 27 is a diagram useful in describing path audit processing conforming to agreement and non-agreement of path setting states in the central controller CC and in each of the common units.

(j) Path Audit Processing Between Firmware and Hardware

The foregoing relates to path audit processing between the central controller CC and the common unit or discrete unit. However, path audit processing is carried out periodically between the firmware and hardware of the common unit or discrete unit as well. More specifically, the common unit 12 (see FIG. 6) is equipped with firmware (a processor and program) and hardware (the VC conversion table 34). The firmware holds path setting information, which has been specified by the central controller 14a, in the memory 36 in the form of a bitmap in software fashion, and inputs this path setting information to the VC conversion table 34 constituted by an LSI. The VC conversion table 34 holds this path setting information in the form of a bitmap in hardware fashion and subjects input cells to routing processing.

Under these conditions the firmware periodically compares the bitmap information held by the hardware and the bitmap information which it itself holds, determines whether the path has been set as specified by the hardware and executes matching processing if the compared items of bitmap information to not agree.

Figure 28:
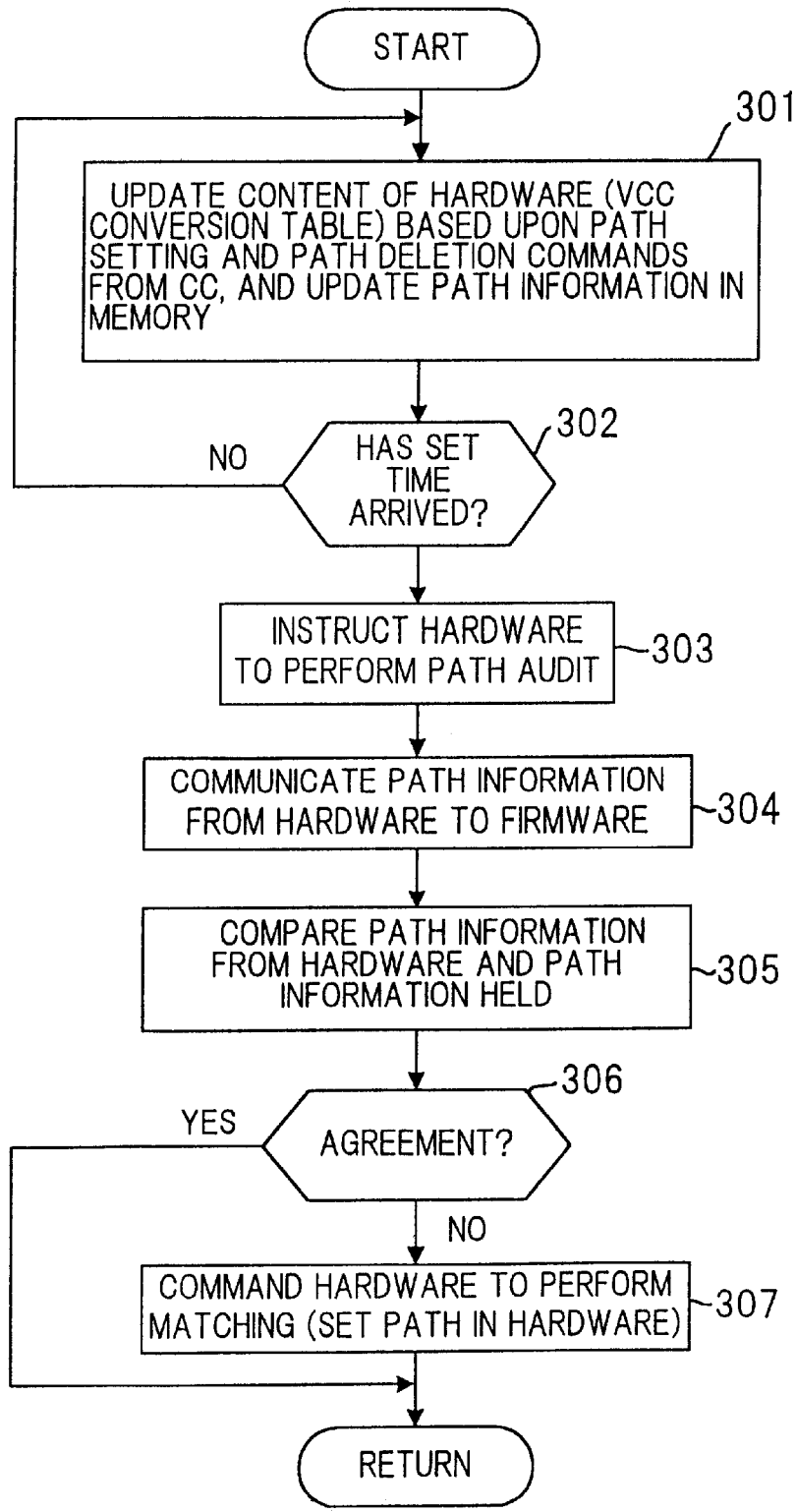
FIG. 28 is a flowchart of processing for path audit between firmware and hardware of a common unit.

FIG. 28 is a flowchart of path audit control between firmware and hardware of a common unit. The firmware updates the content of the hardware (the VC conversion table 34) based upon path setting and path deletion commands from the central controller CC and updates the path (UPC) setting information in memory 36 (step 301). The firmware then checks to see whether a set time has arrived (step 302) and repeats processing from step 301 onward if the set time has not yet arrived.

When the set time arrives, the hardware is instructed to perform a path audit (step 303). In response to this path audit indication, the hardware communicates to the firmware the path setting bitmap information held by the hardware itself (step 304). The firmware compares the path setting bitmap information which it itself holds in the memory 36 with the bitmap information that has been received from the hardware (step 305). In case of non-agreement, the firmware sets the path setting information, which it itself holds, in the hardware by a path setting command (steps 306, 307).

(k) Processing When Path is Set Redundantly

Figure 29:
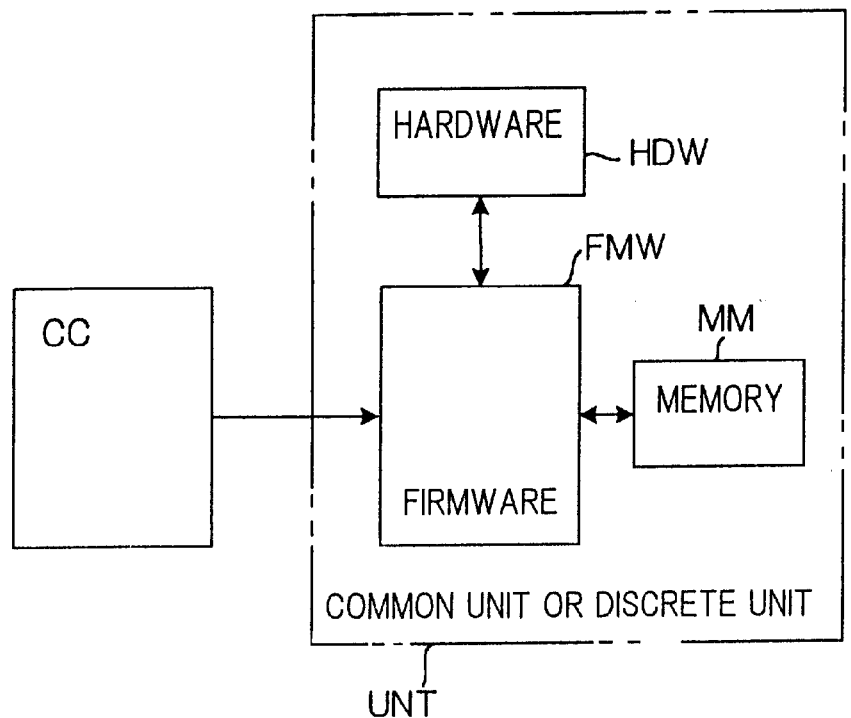
FIG. 29 is a block diagram for describing processing when a path is set redundantly.

FIG. 29 is a diagram showing an arrangement useful in describing processing when a path is set redundantly. The arrangement includes the central controller CC, a common or discrete unit UNT, firmware FMW, a memory MM and hardware HDW.

When a path has been set again from the central controller CC by the same channel identifier (VPI/VCI) in a case where a path that should have been deleted from the central controller CC remains in the common or discrete unit UNT (i.e., the VPI/VCI is the same but the value of the ICID-A is different), redundancy is registered and hardware-related problems occur. In such case service must be halted and the common or discrete unit must be re-incorporated, causing considerable difficulties for the customer. Accordingly, when a path has been set redundantly, the firmware FMW is notified of an alarm without hardware failure and the redundant path setting is canceled by the firmware.

Figure 30:
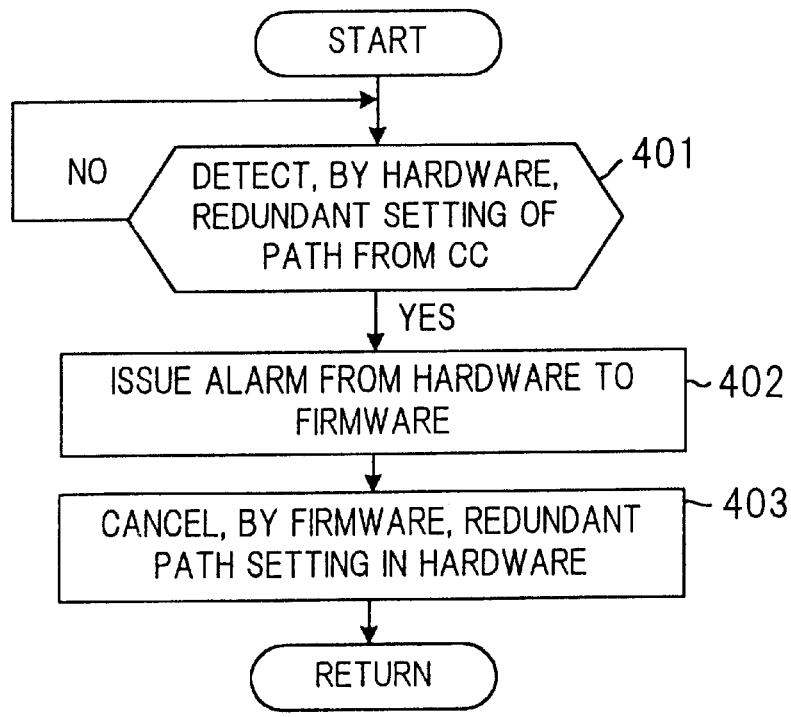
FIG. 30 is a flowchart of processing when a path is set redundantly.

FIG. 30 is a flowchart of processing executed at the time of such redundant path setting.

The hardware HDW detects, on the basis of an indication from the central controller CC, whether the firmware FMW has set a path redundantly (step 401). If redundant setting of a path is detected, the firmware FMW is notified of this by an alarm (step 402). In response to the alarm, the firmware FMW cancels the redundantly set path (step 403).

(l) Path Audit Between Common Unit and Discrete Unit

Path audit between the central controller CC and discrete units has been described above. However, an arrangement can be adopted in which path audit is performed between a common unit and a discrete unit and the result of the path audit is communicated to the central controller CC.

In accordance with the present invention, a unit within a switch holds, in the form of a bitmap, an indication as to whether each channel identifier is being used to establish a path. A central controller CC sends information, which indicates whether each channel identifier has been used to establish a path to the above-mentioned unit in bitmap form. The unit compares bitmap information which it itself is holds with bitmap information that has been sent from the central controller. In a case where the bitmap information being held and the bitmap information that has been sent do not agree, matching processing is executed by cooperation between the central controller and the unit in such a manner that the compared bitmap information will be made to agree. As a result, unset paths and floating paths can be detected and dealt with easily and quickly, thereby improving the quality of service provided to users.

In accordance with the present invention, path information being managed by the central controller CC is periodically compared with path information being managed by a common unit or discrete unit. In a case where the compared items of information differ, matching processing is executed to make the information agree. This makes it possible to prevent communication failure and abnormal operation such as excessive billing caused by mismatching of the information.

In accordance with the present invention, firmware periodically compares bitmap information held by hardware and bitmap information held by the firmware itself in software fashion, determines whether a path has been established as specified by the hardware and performs matching processing in case of non-agreement. As a result, path audit can be performed between firmware and hardware, thereby making it possible to improve the quality of service provided to customers.

In accordance with the present invention, path audit can be performed with regard to units in working and standby systems in a case where a common unit or discrete unit in a switch has been duplexed. As a result, unset paths and floating paths can be detected and dealt with easily and quickly even in a duplexed system, thereby improving the quality of service provided to users.

In accordance with the present invention, path audit is carried out with regard to each channel identifier before and after conversion even in a case where the channel identifiers are converted a plurality of times. Accordingly, even when channel identifiers are converted a plurality of times to multicast cells, unset paths and floating paths can be detected and dealt with easily and quickly, thereby improving the quality of service provided to users.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling path audit in a switch in which a central controller establishes, in correspondence with channel identifiers, cell routing paths in a unit within the switch, and cells are routed to prescribed lines in accordance with the routing paths, comprising the steps of:

holding in the unit within the switch, information in bitmap form indicating whether each channel identifier is being used to establish a path;

sending information in bitmap form indicating whether each channel identifier has been used to establish a path from the central controller to said unit; and comparing said bitmap information held in said unit with said bitmap information that has been sent from said central controller, thereby to determine whether a path has been normally established in said unit as specified by said central controller.

2. A method of controlling path audit in a switch in which a central controller establishes, in correspondence with channel identifiers, cell routing paths in a unit within the switch, and cells are routed to prescribed lines in accordance with the routing paths, comprising the steps of:

holding in the unit within the switch, information in bitmap form indicating whether each channel identifier is being used to establish a path;

sending information in bitmap form indicating whether each channel identifier has been used to establish a path from the central controller to said unit; and comparing said bitmap information held in said unit with said bitmap information that has been sent from said central controller, thereby to determine whether a path has been normally established in said unit as specified by said central controller, wherein in a case where the bitmap information held by said unit and the bitmap information that has been sent from said central controller do not match, said central controller and said unit cooperate to execute matching processing in such a manner that the compared items of bitmap information will be made to match.

3. The method according to claim 2, wherein said unit is equipped with firmware and software, the firmware holds path setting information, which has been specified by said central controller, in the form of a bitmap in software fashion and inputs the path setting information to hardware, and the hardware holds this path setting information in the form of a bitmap in hardware fashion and applies predetermined processing to an input cell; and the firmware periodically compares the bitmap information held by the hardware and the bitmap information which it itself holds, determines whether a path has been normally established as specified in the hardware and executes matching processing if the compared items of bitmap information do not match, whereby the compared items of bitmap information are made to match.

4. The method according to claim 2, wherein in a case where said unit is constituted redundantly to provide a unit in a working system and a unit in a standby system, path audit processing is executed in regard to these units in both the working and standby systems.

5. The method according to claim 2, wherein the channel identifiers are internal channel identifiers of the switch and are obtained by converting VPI/VCIs that have been added onto cell headers.

6. The method according to claim 2, wherein in a case where a channel identifier of a cell is converted a plurality of times in first and second units of the switch to multicast the cell, the first unit holds, in bitmap form and in regard to each internal channel identifier obtained by a first conversion, an indication as to whether each channel identifier is being used to establish a path, and the second unit holds, in bitmap form and in regard to each internal channel identifier obtained by a second conversion, an indication as to whether each channel identifier is being used to establish a path;

the central controller sends each unit bitmap information indicating whether each channel identifier is being used to establish a path, each unit compares the bitmap information which it itself is holding with the bitmap information that has been sent from said central controller, thereby to determine whether a path has been normally established in each unit as specified by said central controller, and in a case where the bitmap information held by each unit and the bitmap information that has been sent from said central controller do not match, said central controller and each unit cooperate to execute matching processing in such a manner that the compared items of bitmap information will be made to match.

7. The method according to claim 2, wherein said unit has a table holding routing information in correspondence with channel identifiers, and said central controller sets the routing information in the table in correspondence with channel identifiers that have been allocated to calls, and said unit updates the bitmap information based upon this routing information.

8. A method of controlling path audit in a switch in which a central controller established, in correspondence with channel identifiers, cell routing paths in a unit within the switch, and cells that have entered from lines are routed to prescribed lines in accordance with the routing paths, comprising the steps of:

holding in a line interface unit that services as interface to a line, in bitmap form, and for each channel identifier, a first setting as to whether control to be executed originally is possible and a second setting as to whether usage parameter control control is possible in regard to a path specified by the channel identifier;

performing, for each channel identifier, said first setting and said second setting in the line interface unit, and sending bitmap information indicating a first setting state and bitmap information indicating a second setting state of each channel identifier from the central controller to the line interface unit; and comparing the bitmap information indicating said first setting state and said second setting state held in the line interface unit with said bitmap information that has been sent from said central controller, thereby to determine whether the first setting and the second setting have been normally established in said line interface unit as specified by said central controller.

9. A method of controlling path audit in a switch in which cell routing paths are established, in correspondence with channel identifiers, in a first unit within the switch and, cells are routed to prescribed lines in accordance with the routing paths, in addition a first setting as to whether control to be executed originally is possible and a second setting as to whether usage parameter control is possible are made, in correspondence with channel identifiers, in a second unit within the switch, and a predetermined control is executed, comprising the steps of:

holding in said first unit, information in bitmap form indicating whether each channel identifier is being used to establish a path, and holding in said second unit, in bitmap form, and in correspondence with channel identifiers, information indicating whether the first setting has been made and information indicating whether the second setting has been made;

sending information in bitmap form indicating whether each channel identifier has been used to establish a path from said central controller to said first unit;

comparing said bitmap information held in the first unit with the bitmap information that has been sent from said central controller and notifying said central controller of the results of the comparison;

in a case where the compared items of bitmap information do not match, executing in said central controller, matching processing in such a manner that the compared items of bitmap information will be made to match;

sending bitmap information indicating a first setting state and bitmap information indicating a second setting state of each channel identifier from said central controller to said second unit;

comparing the bitmap information held in the second unit with the bitmap information that has been sent from said central controller and notifying said central controller of the results of the comparison; and in a case where the compared items of bitmap information do not match, executing in said central controller, matching processing in such a maimer that the compared items of bitmap information will be made to match.

* * * * *